(12) United States Patent
Crosby et al.

(10) Patent No.: US 12,352,977 B2
(45) Date of Patent: Jul. 8, 2025

(54) WAVEGUIDE SYSTEM FOR NEAR EYE OPTICAL DISPLAYS

(71) Applicant: Snap Inc., Santa Monica, CA (US)

(72) Inventors: David Nicholas Crosby, Oxford (GB); Hutch Hayman Hutchison, Churt (GB); Philip Andrew Greenhalgh, Battle (GB)

(73) Assignee: Snap Inc., Santa Monica, CA (US)

( * ) Notice: Subject to any disclaimer, the term of this patent is extended or adjusted under 35 U.S.C. 154(b) by 530 days.

(21) Appl. No.: 17/655,063

(22) Filed: Mar. 16, 2022

(65) Prior Publication Data

US 2022/0299778 A1 Sep. 22, 2022

Related U.S. Application Data

(60) Provisional application No. 63/161,930, filed on Mar. 16, 2021.

(51) Int. Cl.
  *G02B 27/01* (2006.01)
  *B29D 11/00* (2006.01)
  (Continued)

(52) U.S. Cl.
  CPC .... *G02B 27/0176* (2013.01); *B29D 11/00413* (2013.01); *G02B 6/4251* (2013.01); *G02C 11/10* (2013.01); *G02B 2027/0178* (2013.01)

(58) Field of Classification Search
  CPC .......... G02B 27/01; G02B 27/0101; G02B 27/0103; G02B 27/0172; G02B 27/0176;
  (Continued)

(56) References Cited

U.S. PATENT DOCUMENTS 11,630,325 B1 * 4/2023 Almanza-Workman ..................... G02B 1/11 351/158
2006/0023322 A1 2/2006 Mcneal et al.
(Continued)

FOREIGN PATENT DOCUMENTS

CN 116997746 A 11/2023
EP 3376279 9/2018
(Continued)

OTHER PUBLICATIONS

"International Application Serial No. PCT/EP2022/056876, International Search Report mailed Jul. 25, 2022", 6 pgs.
(Continued)

*Primary Examiner* — Sultan Chowdhury
(74) *Attorney, Agent, or Firm* — Schwegman Lundberg & Woessner, P.A.

(57) ABSTRACT

An encapsulated waveguide system for a near eye optical display includes a first outer layer, a second outer layer, at least one waveguide substrate comprising an input area and an output area, a first spacer and a sealing element. The at least one waveguide substrate is disposed between the first and second outer layers and spaced therefrom by the first spacer. The sealing element joins edges of the first and second outer layers so as to encapsulate the at least one waveguide substrate within a cavity formed by the first and second outer layers. The formed cavity includes a first cavity between the at least one waveguide substrate and the first outer layer and a second cavity between the at least one waveguide substrate and the second outer layer.

20 Claims, 36 Drawing Sheets

(51) Int. Cl.
   *G02B 6/42*   (2006.01)
   *G02C 11/00*   (2006.01)
(58) Field of Classification Search
   CPC ...... G02B 6/00; G02B 6/0028; G02B 6/0046;
       G02B 6/0065; G02B 6/0088; G02B
       6/0093; G02B 6/4251; B29D 11/00;
       B29D 11/00413; B29D 11/00019; B29D
       11/00355; B29D 11/00423; B29D
       11/00432; G02C 11/00; G02C 11/04;
       G02C 11/10
   See application file for complete search history.

(56) References Cited

U.S. PATENT DOCUMENTS

| | | | |
|---|---|---|---|
| 2014/0240842 A1 | 8/2014 | Nguyen et al. | |
| 2017/0227771 A1* | 8/2017 | Sverdrup | G02B 5/289 |
| 2020/0096772 A1 | 3/2020 | Adema et al. | |
| 2020/0096790 A1* | 3/2020 | Blum | G02C 7/086 |
| 2023/0204958 A1* | 6/2023 | Fliszar | G02B 27/0176 345/8 |
| 2023/0273457 A1* | 8/2023 | Graf | G02B 27/0172 351/159.01 |
| 2024/0231099 A1* | 7/2024 | Danziger | G02B 6/4206 |

FOREIGN PATENT DOCUMENTS

| | | |
|---|---|---|
| WO | 2014093601 | 6/2014 |
| WO | WO-2022194958 A1 | 9/2022 |

OTHER PUBLICATIONS

"International Application Serial No. PCT/EP2022/056876, Written Opinion mailed Jul. 25, 2022", 6 pgs.

* cited by examiner

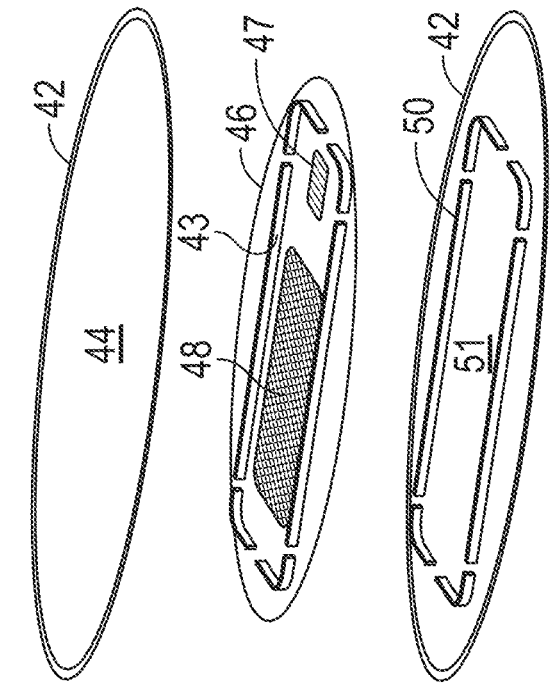
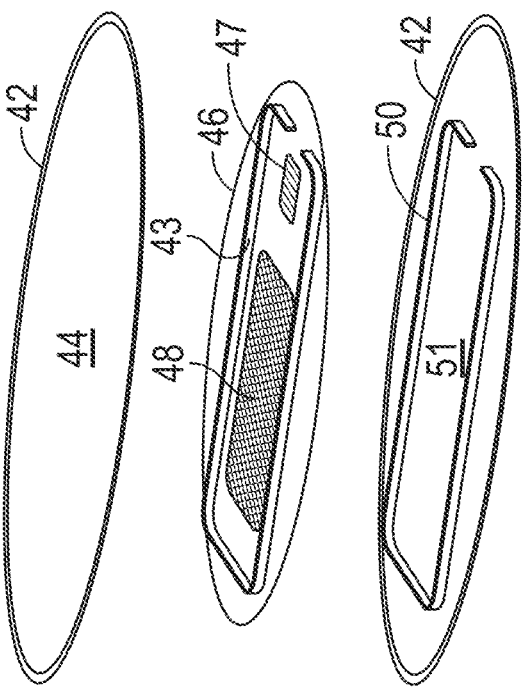
FIG. 3E

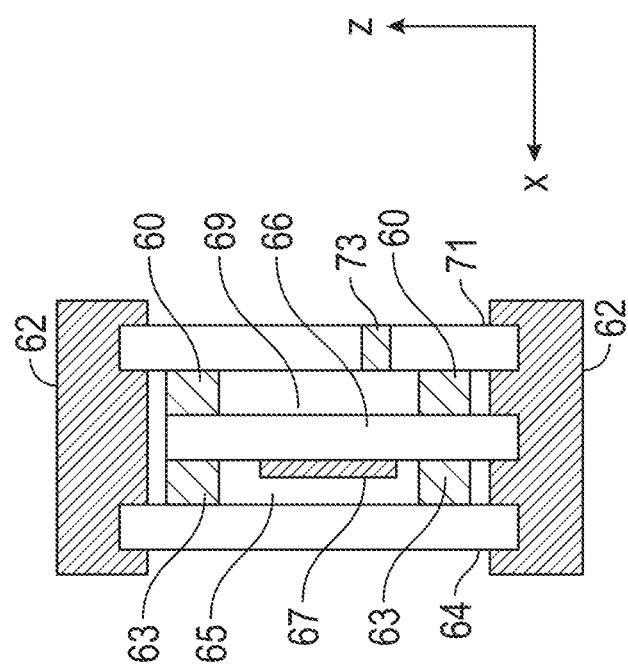

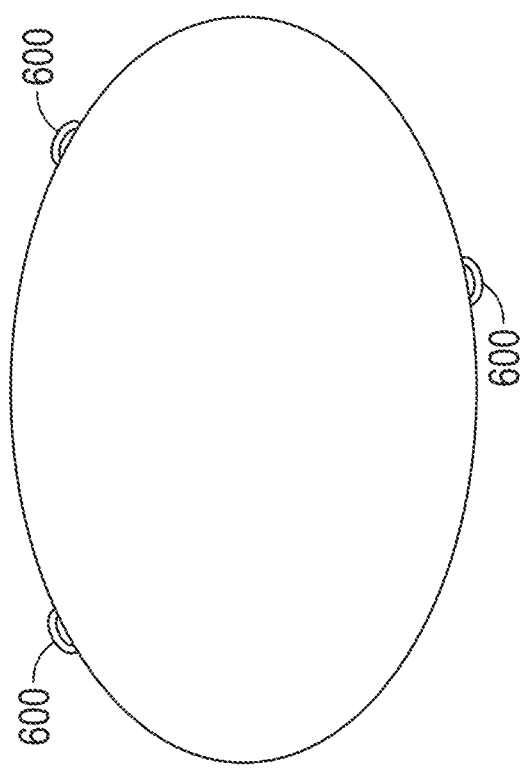

WAVEGUIDE SYSTEM FOR NEAR EYE OPTICAL DISPLAYS

CROSS-REFERENCE TO RELATED APPLICATION

The present application claims priority to U.S. Provisional Patent Application No. 63/161,930, filed Mar. 16, 2021, and entitled "WAVEGUIDE SYSTEM FOR NEAR EYE OPTICAL DISPLAYS," the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present technology relates to near eye optical display systems and, more particularly but not exclusively to near-eye optical waveguide systems. Some embodiments relate to waveguide systems configured for augmented reality and/or virtual reality devices. Some embodiments relate to near-eye optical displays incorporating the waveguides systems. Some embodiments relate to augmented reality and/or virtual reality displays incorporating the waveguide systems. Some aspects relate to optical methods relating to the waveguide systems. Some method embodiments relate to optical methods for mitigating optical distortion in the waveguides systems.

BACKGROUND

Optical waveguides may be used in near-eye display systems, such as augmented reality displays and/or virtual reality displays. An augmented reality display allows a user to view their surroundings as well as projected images. These projected images may, for instance, convey additional information about the user's surroundings so as to augment their perception of the physical world. These projected images are first generated by a light projector or other light engine, then collected by, channeled via, replicated by and directed by a waveguide system towards the user's eye. Because the waveguide is transparent, a user is able to see the real world as though wearing ophthalmic glasses. The projected images, due to their higher brightness, are overlaid on the image of the user's surroundings so as to form the final image perceived by the user. The waveguide system is thus an intricate optical piece of equipment that simultaneously accomplishes several tasks. By way of example, to do so, it may comprise a transparent waveguide substrate accommodating an input area and an output area located either on the same major surface or on opposing major surfaces; alternatively, the input or output areas may be within the thickness of the transparent waveguide substrate. The projector light is coupled in by the input area into the transparent waveguide substrate, then propagates along said substrate via total internal reflection until being coupled out from said substrate by the output area towards the user's eye. The input area and the output area are typically made of a refractive index matched spin coated polymer layer on the transparent waveguide substrate surface that may be embossed by a master mold and cured by UV light (nano-imprinting), or exposed to UV through a mask and etched via a chemical process that discriminates between exposed and unexposed areas (nano-lithography), so as to form nanometer-sized patterns able to diffract light in a controlled manner.

The input area and output area may be diffractive optical nanostructures such as gratings, surface relief gratings or holographic optical elements.

The waveguide system family may include not only diffractive waveguide systems such as the ones mentioned earlier but also reflective waveguide systems such as the one based on glass-embedded tilted reflective structures. The precise nature of the nanostructures that diffract the image bearing light introduced to the transparent waveguide substrate by the input area and subsequently directed towards the eye of a user through the output area may be susceptible to environmental contamination. The presence of water vapor and/or dust particles in the atmosphere may affect the optical behavior of the nanometer-sized diffractive patterns and consequently compromise the operation of the waveguide system. It is thus desirable to exclude water vapor and dust particles from the waveguide system.

SUMMARY

According to one aspect of the present technology, an encapsulated waveguide system for a near eye optical display may comprise: a first outer layer, a second outer layer, at least one waveguide substrate comprising an input area and an output area, a first spacer, a sealing element, wherein the at least one waveguide substrate is disposed between the first and second outer layers and spaced therefrom by the first spacer wherein the sealing element joins the first and second outer layers so as to encapsulate the at least one waveguide substrate within a cavity formed by the first and second outer layers; and wherein the formed cavity comprises a first cavity between the at least one waveguide substrate and the first outer layer and a second cavity between the at least one waveguide substrate and the second outer layer.

BRIEF DESCRIPTION OF THE DRAWINGS

In order that embodiments of the present disclosure may be more readily understood, reference will now be made to the accompanying drawings, in which:

FIG. 3E represents an exploded view of the encapsulated waveguide system according to a second embodiment in which different examples of spacers may be adopted.

FIG. 4B depicts a cross sectional view of the encapsulated waveguide system according to a third embodiment.

FIG. 13 shows the protrusions intended to locate and secure the encapsulated waveguide system into a frame.

Figure 1B:
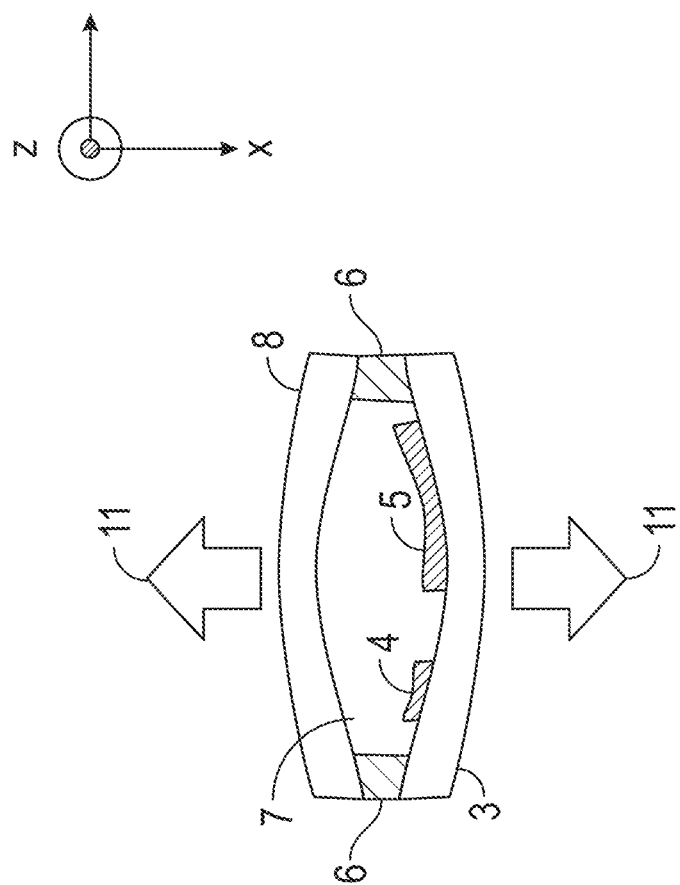
FIG. 1B represents a cross-sectional view of a typical waveguide system subjected to a sudden decrease in ambient pressure.

The drawings referred to in this description should be understood as not being drawn to scale, except if specifically noted, in order to show more clearly the details of the present disclosure. Same reference numbers in the drawings indicate like elements throughout the several views. Other features and advantages of the present disclosure will be apparent from accompanying drawings and from the detailed description that follows.

DETAILED DESCRIPTION

In the following description, for purposes of explanation and not limitation, specific details are set forth, such as particular embodiments, procedures, techniques, etc. in order to provide a thorough understanding of embodiments of the present disclosure. However, it will be apparent to one skilled in the art that the present disclosure may be practiced in other embodiments that depart from these specific details.

The present technology sets out to minimize the dependence of the optical performance of waveguide systems (irrespective of their type) upon moisture, particulate debris and variations of ambient temperature and pressure.

The terms 'ambient pressure' and 'ambient temperature' refer to the pressure and temperature of the ambient atmosphere surrounding the waveguide system, respectively. The ambient atmosphere is characterized by several parameters such as pressure, temperature and composition (gases, liquids e.g., droplets, solids e.g., dust).

Technical features described in this application can be used to construct various embodiments of encapsulated waveguide systems.

In one approach, an encapsulated waveguide system for a near eye optical display has a first outer layer and a second outer layer. One or more waveguide substrates are included in the system. The one or more waveguide substrates have an input area and an output area. A first spacer and a sealing element are included in the system. The waveguide substrate is disposed between the first and second outer layers and spaced therefrom by the first spacer. The sealing element joins the first and second outer layers so as to house or encapsulate the waveguide within a cavity formed by the first and second outer layer. The formed cavity comprises a first cavity between the waveguide substrate and the first outer layer and a second cavity between the waveguide substrate and the second outer layer. The formed cavity may be filled with nitrogen or other inert gas or dry air or other fluid.

As will be explained in more detail below, in some embodiments the first cavity and the second cavity can be in fluid communication with one another to thereby form one entire cavity whilst in some other embodiments, the first cavity and second cavity can be effectively isolated from one another.

In some embodiments, the first outer layer and second outer layer comprise a first optical cover and a second optical cover, respectfully.

In some embodiments, the first cavity is formed between the first cover and the waveguide substrate and a second cavity is formed between the second cover and the waveguide substrate.

In some embodiments, the encapsulated waveguide system is a unibody system for AR/VR near eye display systems.

Figure 1A:
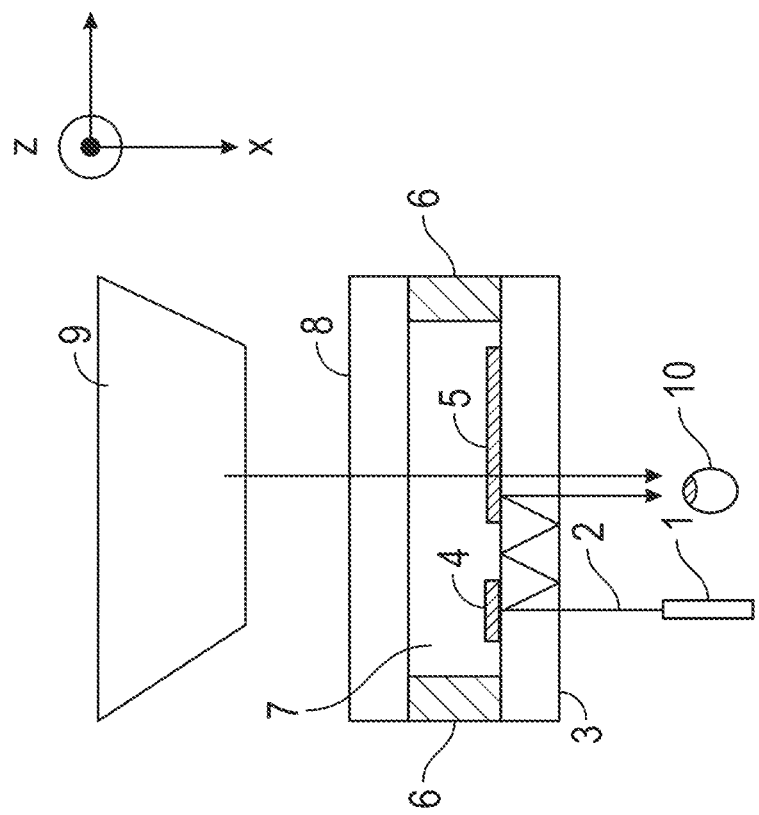
FIG. 1A shows a cross-sectional view of a typical waveguide system, part of an Augmented Reality display.

As shown in FIG. 1A, some current waveguide systems include a projector module 1 that projects images 2 and have a transparent cover 8 affixed on the major surface of the transparent waveguide substrate 3 supporting the input area 4 and the output area 5 via the application of a double-sided adhesive tape gasket 6 surrounding both input and output areas: an air cavity 7 is thus formed when the major surface of the transparent waveguide substrate supporting the input and output areas are encased. The gasket also allows for keeping the transparent cover several tens of microns apart from the transparent waveguide substrate in order to avoid any parasitic optical interaction between the transparent cover and the transparent waveguide substrate. Alternatively, particle loaded adhesive may be used in place of the double-sided adhesive tape gasket to ensure a desired gap distance is achieved between respective components joined using such adhesive. Other means of joining parts to achieve a defined gap distance may also be used. For the purpose of the disclosure, double sided adhesive tape is described, however this may be replaced by other suitable sealing means as will be apparent to the person skilled in the art. Any such adhesive should not compromise the functional performance of the waveguide. A user's eye 10 views the projected images 2 overlaid on an image of the user's surroundings 9.

If such a waveguide system were to be subjected to a sudden increase in ambient temperature and/or a sudden decrease in ambient pressure 11, the transparent waveguide substrate 3 and transparent cover 8 may bend outward due to expansion of the air trapped in the cavity 7 (as shown in FIG. 1B): the ambient atmosphere-facing major surface of the transparent waveguide substrate 3 and transparent cover 8 would adopt a convex form; and the input area 4 and the output area 5 would be thus distorted.

Figure 1C:
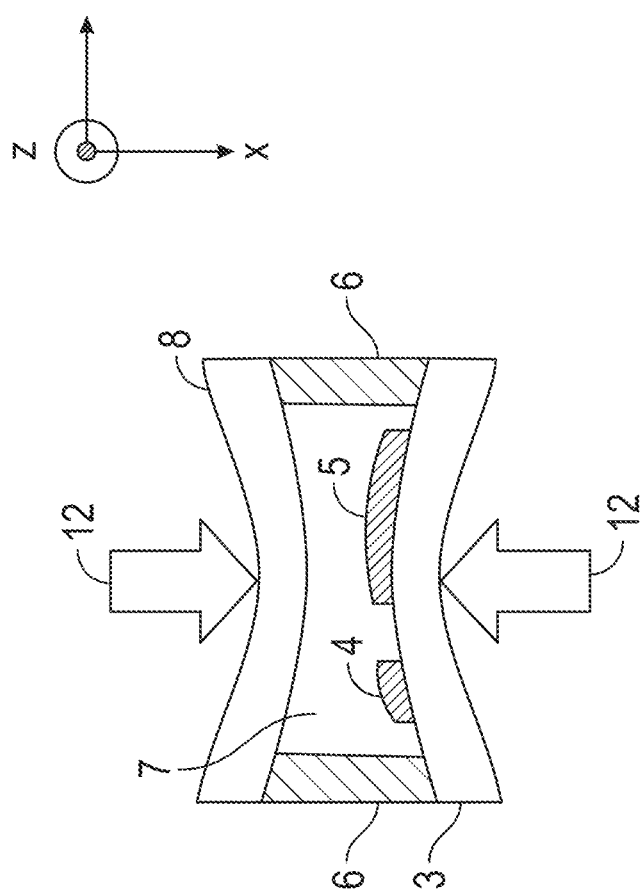
FIG. 1C represents a cross-sectional view of a typical waveguide system subjected to a sudden increase in ambient pressure.

If such a waveguide system were to be subjected to a sudden decrease in ambient temperature and/or a sudden increase in ambient pressure 12, the transparent waveguide substrate 3 and transparent cover 8 would bend inward induced by the contraction of the air trapped in the cavity (as shown in FIG. 1C): the ambient atmosphere-facing major surface of the transparent waveguide substrate 3 and transparent cover 8 would adopt a concave form and the input area 4 and the output area 5 would be thus distorted. Accordingly, the variations of ambient pressure and/or variations of ambient temperature would result in the distortion of the input area 4 and output area 5 of the transparent waveguide substrate 3, causing the irremediable alteration of the projected images. Image aberration, artefacts, loss of sharpness i.e., loss of Modulation Transfer Function, loss of focus, color dispersion, image distortion would be possible symptoms of the aforementioned issue. (If the input and output areas 4, 5 were to be located within the transparent waveguide substrate 3, they would be distorted as long as the transparent waveguide substrate 3 is.)

Figure 2A:
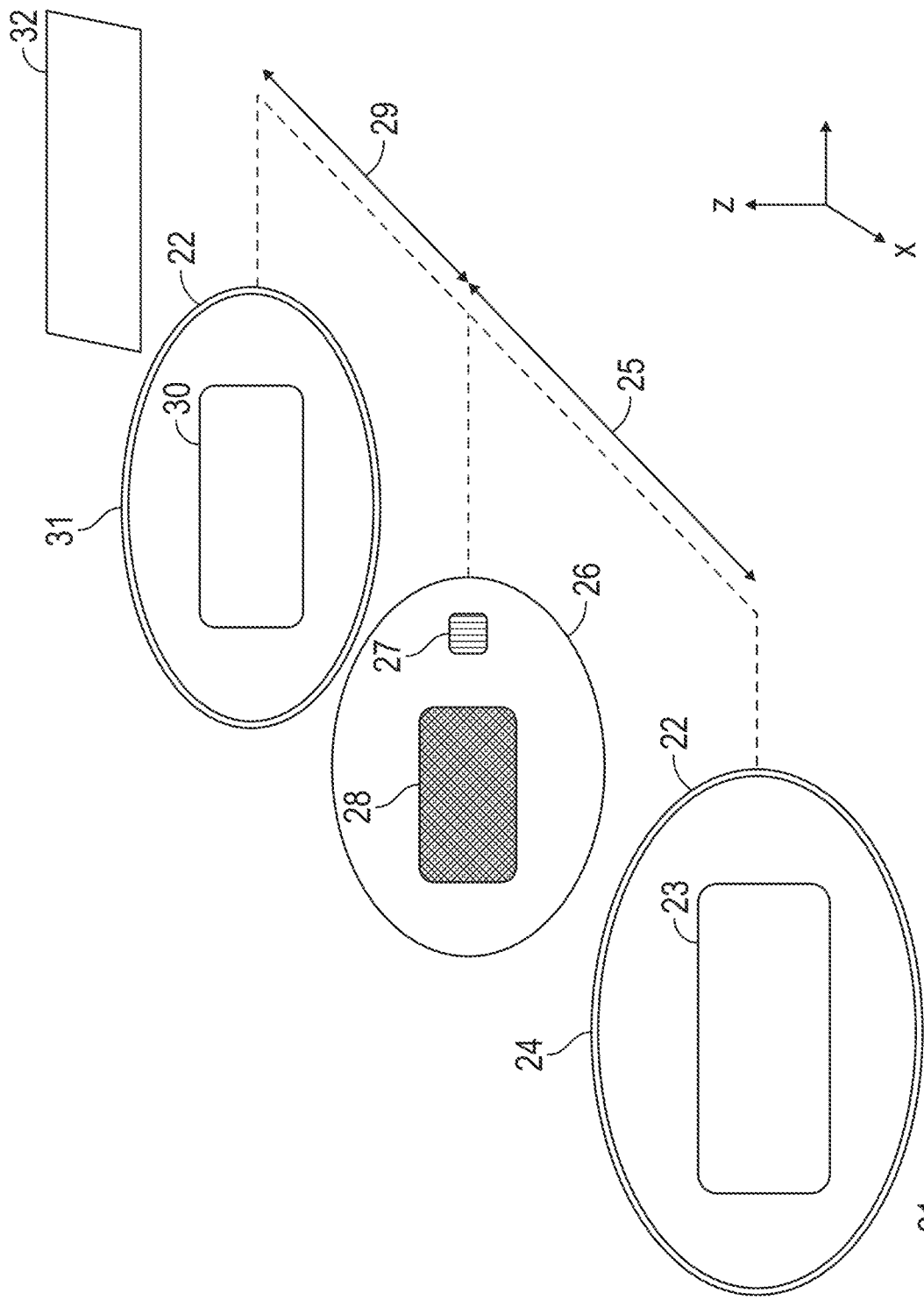
FIG. 2A depicts an exploded view of the encapsulated waveguide system according to a first embodiment.
Figure 2B:
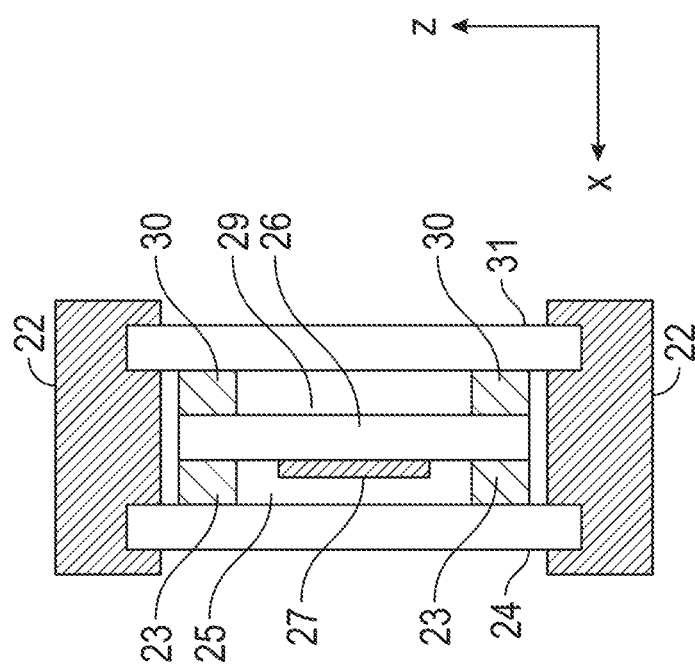
FIG. 2B shows a cross sectional view of the encapsulated waveguide system according to a first embodiment.

FIGS. 2A and 2B respectively depict a schematic exploded view and side view of an encapsulated waveguide system according to a first embodiment of the present technology. The transparent waveguide substrate 26 is arranged between a first outer layer, which in FIG. 2A is the first transparent rigid cover 24, and a second outer layer, which in FIG. 2A is second transparent rigid cover 31. In some other embodiments, such as for virtual reality display systems, the cover 31, which when the optical system is in use, is furthest from the eye (second transparent cover in FIG. 2A), is made opaque rather than transparent (for example by covering with a reflective coating or using non-transparent cover material). A viewer's surroundings 32 may also be seen by a user's eye 21 in some embodiments where the second transparent cover 31 is transparent.

Figure 2C:
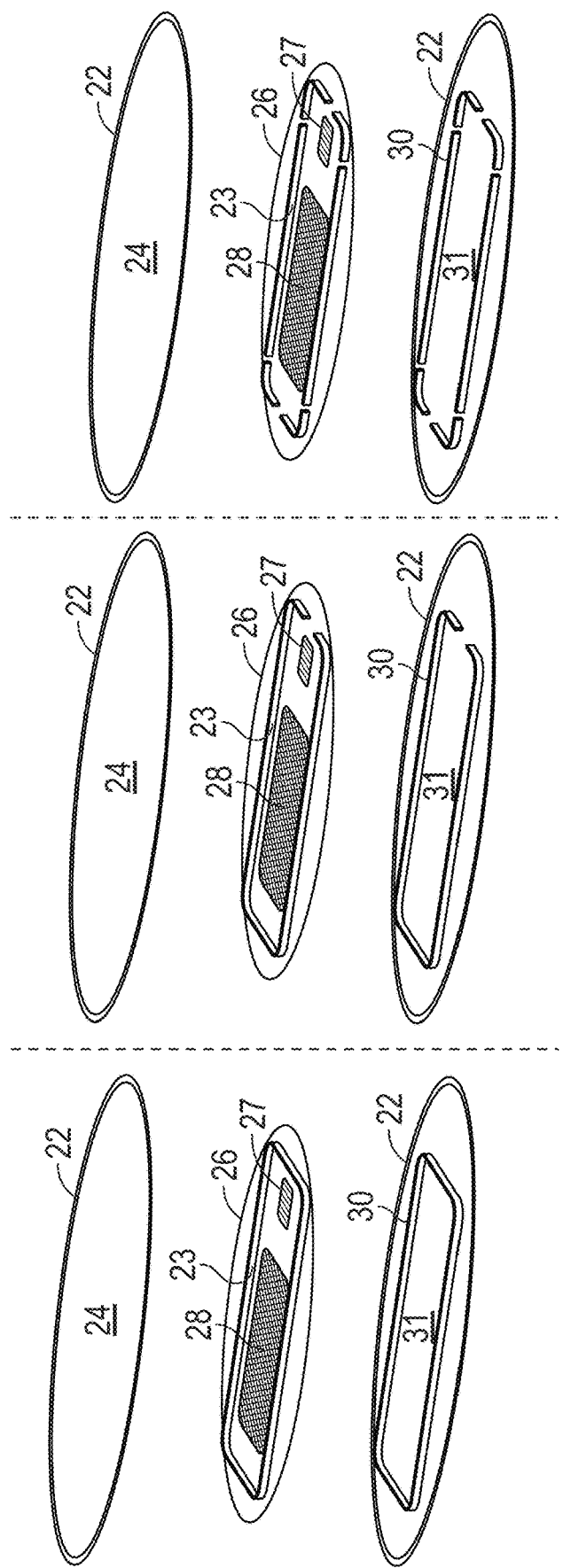
FIG. 2C represents an exploded view of the encapsulated waveguide system according to a first embodiment in which different examples of spacers may be adopted.

The transparent waveguide is made from an optical transparent material such as but not limited to glass. The transparent waveguide substrate 26 arranged between the first transparent rigid cover 24 and the second transparent rigid cover 31 is hermetically sealed by a sealing element 22. The transparent waveguide substrate 26 is disposed on and spaced apart from the first transparent rigid cover 24 and second transparent rigid cover 31 via one or more spacers. In some embodiments, the transparent waveguide substrate 26 is attached to or affixed on and spaced apart from the first transparent rigid cover 24 and second transparent rigid cover 31 cover via double-sided adhesive tape gaskets 23, 30, respectively. In some embodiments, spacers other than gaskets may be adopted. This arrangement results in the formation of two air or other fluid cavities 25, 29 spaced apart from the transparent waveguide substrate 26. The transparent waveguide substrate 26 is smaller than the first transparent rigid cover 24 and second transparent rigid cover 31 in at least one direction e.g., the z-axis direction (See FIG. 2B). The gaskets 23, 30 may be continuous, as shown in FIG. 2A, or may be discontinuous, as shown by way of example in FIG. 2C. The transparent waveguide substrate 26 comprises an input area 27 and an output area 28 on its major surface facing the user's eye 21 and the projector module 20. The input area 27 and output area 28 are diffractive optical nanostructures such as gratings, surface relief gratings or holographic optical elements. In some other embodiments, the input area 27 and/or output area 28 may be any other type of input area and/or output area used in waveguides for near eye waveguide systems.

The first transparent rigid cover 24 and second transparent rigid cover 31 are depicted with respect to a user's eye 21, with the first transparent rigid cover 24 being closest to the eye position and the second transparent rigid cover 31 being furthest from the eye position. Sealing element 22 is applied around the perimeter of the first transparent rigid cover 24 and second transparent rigid cover 31 so as to cover the edges or minor surfaces of the rigid covers and a portion of the major surface in proximity to the minor surfaces since the transparent waveguide substrate 26 is smaller than the first transparent rigid cover 24 and second transparent rigid cover 31 in at least one direction e.g., the z-axis direction (See FIG. 2B). The sealing element 22, the first transparent rigid cover 24 and the second transparent rigid cover 31 may be made of the same material. The first and second transparent rigid covers may be joined by processes such as laser welding or ultrasonic welding, which effectively cause fusing of the materials without the need for glue. Another possibility would involve 3D printing the first and second transparent rigid covers in one single action and depositing the transparent waveguide substrate during the printing process. In some other embodiments, the first cover 24 may be made from a different material to the second cover 31.

Alternatively, the first and second transparent rigid covers may be joined using a sealing element in the form of but not limited to adhesives including any one or combination of and not limited to pressure sensitive adhesive, cyanoacrylate, UV cured adhesive, epoxy resin, heat seal adhesive or the like.

Sealing element 22 and the first and second transparent rigid covers 24, 31 may provide a sufficiently resilient encapsulation of the transparent waveguide substrate 26, such that the latter is unaffected by changes in the ambient pressure. In other words, there is no pressure differential across the transparent waveguide substrate 26 i.e., the respective pressures in cavities 25, 29 are identical. Therefore, the input area 27 and output area 28 of the transparent waveguide substrate are not distorted. The first embodiment of the present technology is thus insensitive to the environmental conditions of the ambient atmosphere e.g., protection from environmental contamination like dust and particulate debris, as well as protection against moisture and changes in ambient pressure.

The input area 27 and output area 28 may be preferentially located on the proximal major surface of the transparent waveguide substrate, which surface, when the optical system is in use, is nearest the user's eye 21. Alternatively, the input area 27 and output area 28 may be located on the distal major surface of the transparent waveguide substrate, which surface, when the optical system is in use, is furthest from the user's eye 21 or they may be located on opposite major surfaces of, or within, the transparent waveguide substrate, taking advantage of the possibility of using reflective or transmissive areas and the fact that both major surfaces of the transparent waveguide substrate are shielded from the ambient atmosphere.

Figure 3A:
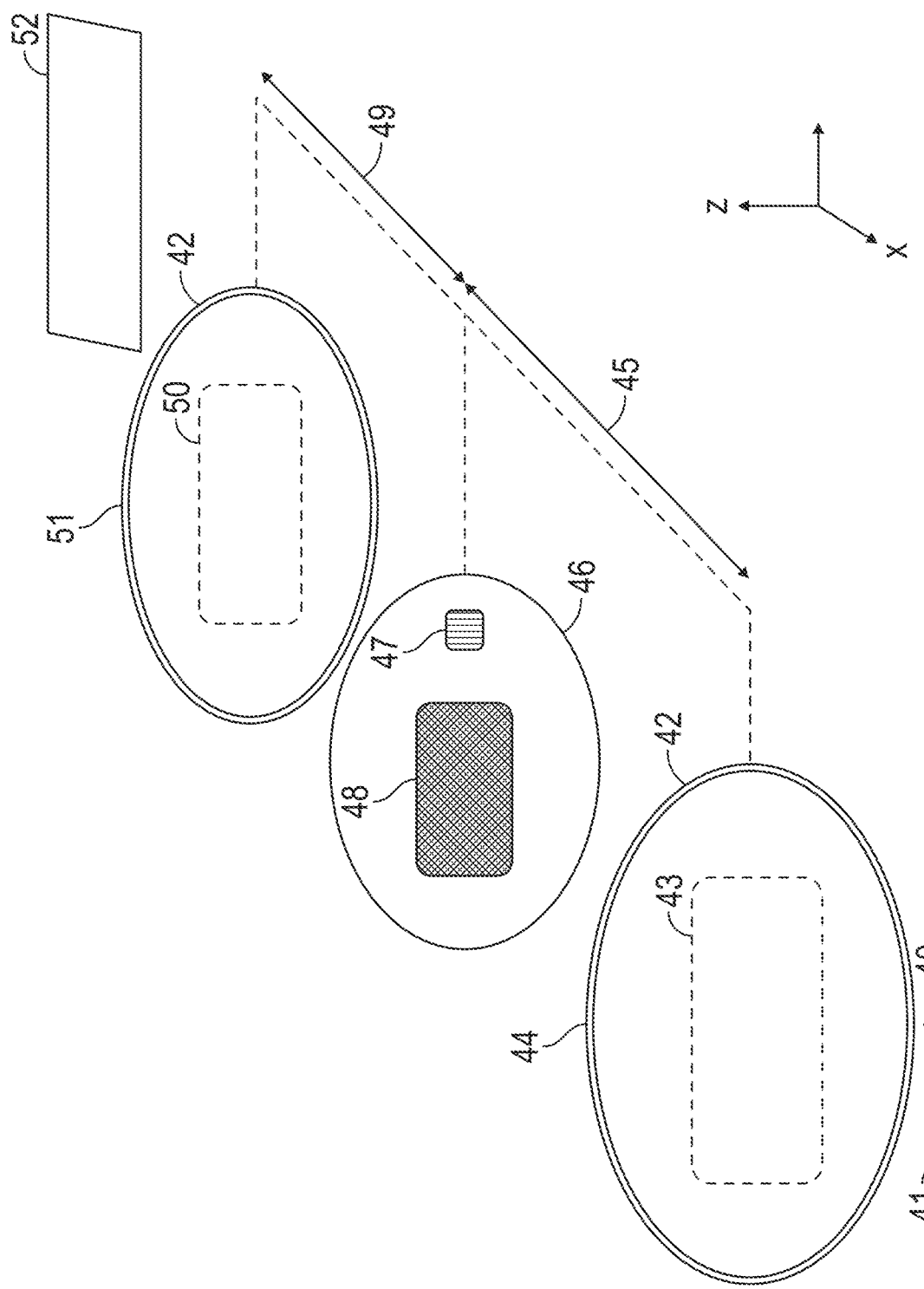
FIG. 3A represents an exploded view of the encapsulated waveguide system according to a second embodiment.
Figure 3B:
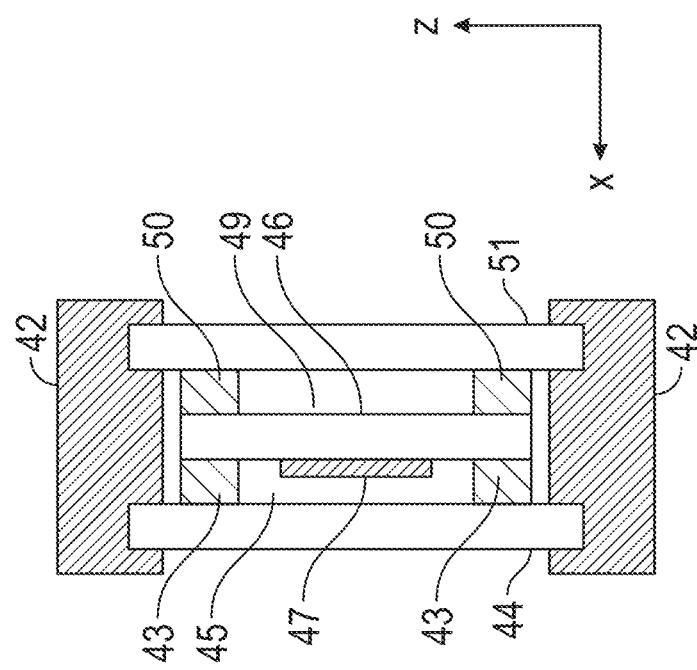
FIG. 3B depicts a cross sectional view of the encapsulated waveguide system according to a second embodiment.

FIGS. 3A and 3B respectfully depict a schematic exploded view and a side view of an encapsulated waveguide system according to a second embodiment of the present technology. The transparent waveguide substrate 46 is arranged between a first outer layer, which in FIG. 3A is the first transparent rigid cover 44, and a second outer layer, which in FIG. 3A is second transparent rigid cover 51. In some other embodiments, such as for virtual reality display systems, the cover 31, which when the optical system is in use, is furthest from the eye (second transparent cover in FIG. 3A), is made opaque rather than transparent (for example by covering with a reflective coating or using non-transparent cover material).

The transparent waveguide is made from an optical transparent material such as but not limited to glass. The transparent waveguide substrate 46 arranged between the first transparent rigid cover 44 and the second transparent rigid cover 51 is hermetically sealed by a sealing element 42. The substrate 46 is disposed on and spaced apart from the first transparent rigid cover 44 and second transparent rigid cover 51 via one or more spacers. In some embodiments, the transparent waveguide substrate 46 is affixed on and spaced apart from the first transparent rigid cover 44 and second transparent rigid cover 51 cover via discontinuous double-sided adhesive tape gaskets 43, 50, respectively (or other gap spacing adhesive) to effectively define a connected volume within the encapsulated waveguide system. In some embodiments, spacers other than gaskets may be adopted. The transparent waveguide substrate 46 is smaller than the first transparent rigid cover 44 and second transparent rigid cover 51 in at least one direction e.g., the z-axis direction (See FIG. 3B). Non limiting examples of discontinuous gaskets 43, 50 that may be used are shown in FIG. 3E. The transparent waveguide substrate 46 comprises an input area 47 and an output area 48 on its major surface facing the user's eye 41 and the projector module 40. The input area 47 and output area 48 are diffractive optical nanostructures such as gratings, surface relief gratings or holographic optical elements. In some embodiments, the input area 47 and/or output area 48 may be other types of input area and/or output area used in near eye waveguide systems.

The first transparent rigid cover 44 and second transparent rigid cover 51 are depicted with respect to a user's eye 41, with the first transparent rigid cover 44 being closest to the eye position and the second transparent rigid cover 51 being furthest from the eye position.

Sealing element 42 is applied around the perimeter of the first transparent rigid cover 44 and second transparent rigid cover 51 so as to cover the minor surfaces and a portion of the major surface in proximity to the minor surfaces since the transparent waveguide substrate 46 is smaller than the first transparent rigid cover 44 and second transparent rigid cover 51 in at least one direction e.g., the z-axis direction (See FIG. 3B).

The sealing element 42, the first transparent rigid cover 44 and the second transparent rigid cover 51 may be made of the same material. For instance, the first and second transparent rigid covers may be joined by processes such as laser welding or ultrasonic welding, which effectively cause fusing of the materials without the need for glue. Another possibility would involve 3D printing the first and second transparent rigid covers in one single action and depositing the transparent waveguide substrate during the printing process. In some other embodiments, the first cover 44 may be made from a different material to the second cover 51.

Alternatively, the first and second transparent rigid covers may be joined using a sealing element in the form of but not limited to adhesives including any one or combination of and not limited to pressure sensitive adhesive, cyanoacrylate, UV cured adhesive, epoxy resin, heat seal adhesive or the like. Sealing element 42 and the first and second transparent rigid covers 44, 51 may not provide a sufficiently resilient encapsulation of the transparent waveguide substrate 46, such that the transparent waveguide substrate may be affected by changes in the ambient pressure. To avoid any pressure differential across the transparent waveguide substrate 46 i.e., to avoid having two different pressures in cavities 45, 49, both cavities 45, 49 are connected to each other via the use of discontinuous double-sided adhesive tape gaskets 43, 50. Consequently, the input area 47 and output area 48 are not distorted. (The fluid connection between cavities 45, 49 is insured by using discontinuous double-sided adhesive tape gaskets 43, 50 and the fact that at least one dimension of the transparent waveguide substrate 46 is smaller than the first transparent rigid cover 44 and second transparent rigid cover 51 in at least one direction e.g., the z-axis direction (See FIG. 3B).

Figure 3D:
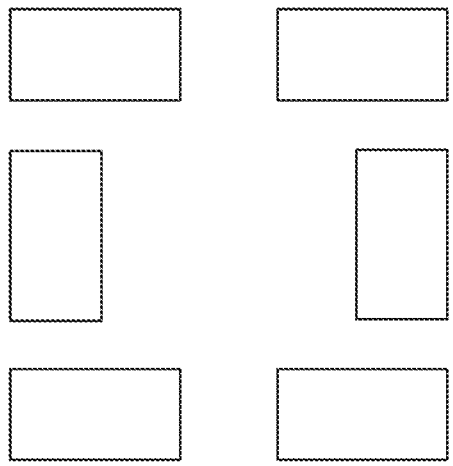
FIG. 3D depicts a discontinuous double-sided adhesive tape gasket presenting a plurality of discontinuities and employed in the second embodiment.
Figure 3C:
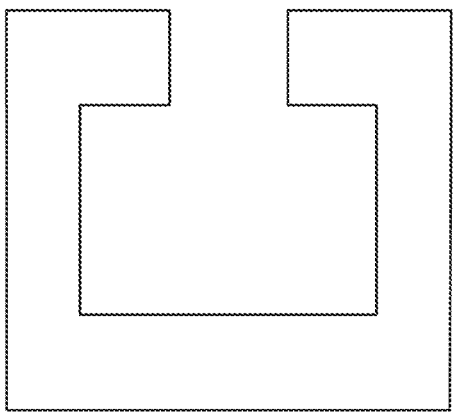
FIG. 3C shows a discontinuous double-sided adhesive tape gasket presenting a single discontinuity and employed in the second embodiment.

FIGS. 3C and 3D represent examples of discontinuous double-sided adhesive tape gasket 43, 50 that could be used in the third embodiment of the present technology. FIG. 3C depicts a gasket presenting a single discontinuity while FIG. 3D a gasket having a plurality of discontinuities by using a plurality of small pieces of double-sided adhesive tape, spaced from each other.

The input area 47 and output area 48 may be preferentially located on the proximal major surface of the transparent waveguide substrate, which surface, when the optical system is in use, is nearest the user's eye 41. Alternatively, the input area 47 and output area 48 may be located on the distal major surface of the transparent waveguide substrate, which surface, when the optical system is in use, is furthest from the user's eye 41 or they may be located on opposite major surfaces of, or within, the transparent waveguide substrate, taking advantage of the possibility of using reflective or transmissive areas and the fact that both major surfaces of the transparent waveguide substrate are shielded from the ambient atmosphere.

Figure 4A:
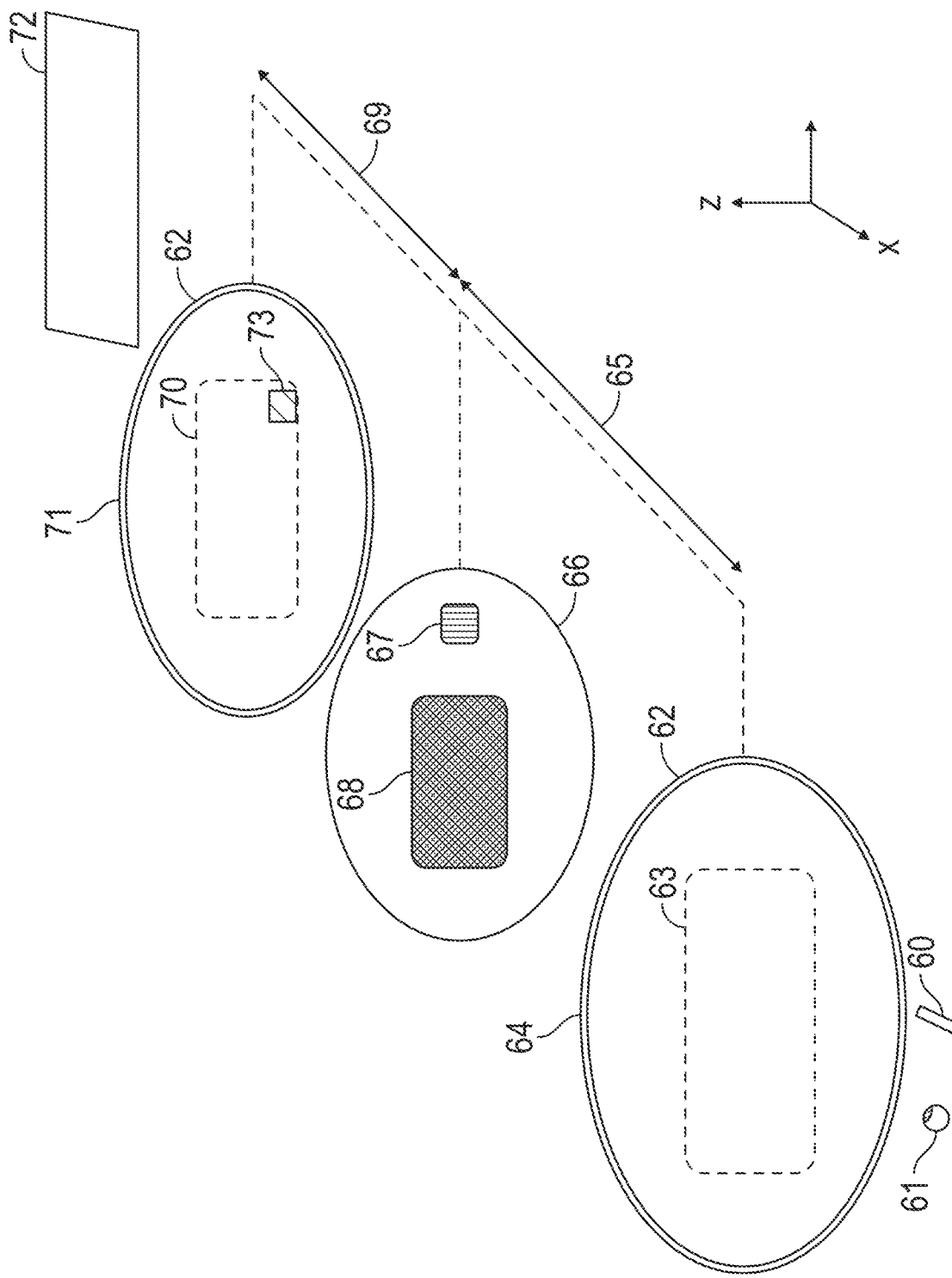
FIG. 4A represents an exploded view of the encapsulated waveguide system according to a third embodiment.

FIGS. 4A and 4B respectfully depict a schematic exploded view and a side view of an encapsulated waveguide system according to a third embodiment of the present technology. The transparent waveguide substrate 66 is arranged between a first outer layer, which in FIG. 4A is the first transparent rigid cover 64, and a second outer layer, which in FIG. 4B is second transparent rigid cover 71. In some other embodiments, such as for virtual reality display systems, the cover 71, which when the optical system is in use, is furthest from the eye (second transparent cover in FIG. 4A), is made opaque rather than transparent (for example by covering with a reflective coating or using non-transparent cover material).

The transparent waveguide is made from an optical transparent material such as but not limited to glass. The transparent waveguide substrate 66 arranged between the first transparent rigid cover 64 and the second transparent rigid cover 71 is hermetically sealed by a sealing element 62. The substrate 66 is disposed on and spaced apart from the first transparent rigid cover 64 and second transparent rigid cover 71 via one or more spacers. In some embodiments, the transparent waveguide substrate 66 is affixed on and spaced apart from the first transparent rigid cover 64 and second transparent rigid cover 71 cover via discontinuous double-sided adhesive tape gaskets 63, 70 (See FIG. 4C), respectively (or other gap spacing adhesive) to effectively define a connected volume within the encapsulated waveguide system. In some embodiments, spacers other than gaskets may be adopted. The transparent waveguide substrate 66 is smaller than the first transparent rigid cover 64 and second transparent rigid cover 71 in at least one direction e.g., the z-axis direction (See FIG. 4B). The transparent waveguide substrate 66 comprises an input area 67 and an output area 68 on its major surface facing the user's eye 61 and the projector module 60. The input area 67 and output area 68 are diffractive optical nanostructures such as gratings, surface relief gratings or holographic optical elements. In some embodiments, the input area 67 and/or output area 68 may be other types of input area and/or output area used in near eye waveguide systems.

Figure 4C:
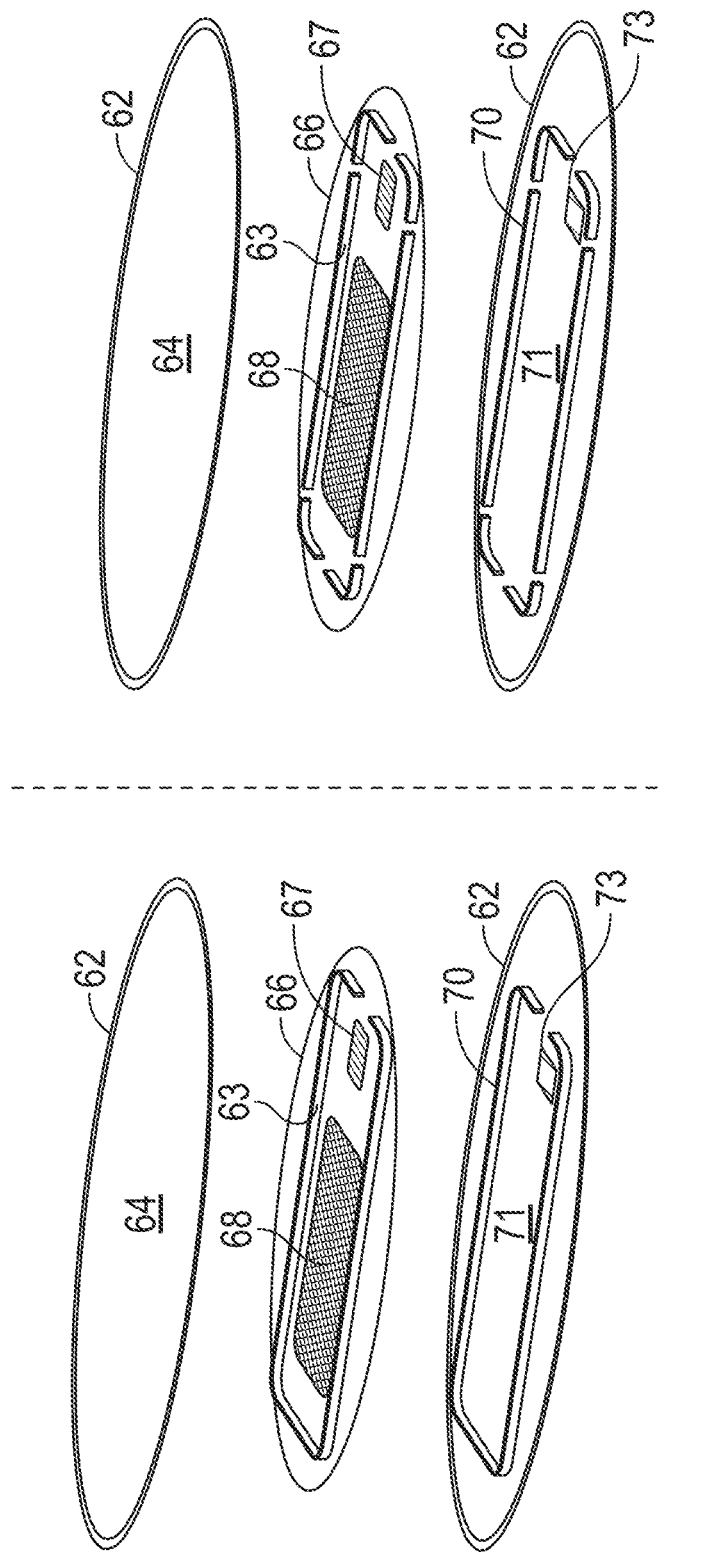
FIG. 4C shows an exploded view of the encapsulated waveguide system according to a third embodiment in which different examples of spacers may be adopted.

A pressure relief element 73 configured to equalize or balance pressure of the space or volume defined by the first cavity 65, the second cavity 69 and the rest of the space comprised between the first transparent rigid cover 64 and the second transparent rigid cover 71, and the ambient atmosphere may be located on or in a major surface of one of the transparent rigid covers 64, 71 (See FIG. 4A-4C). The pressure relief element in this way forms a vent structure that may mitigate ingress of debris and moisture, while ensuring the pressure within the enclosed or encapsulated waveguide is equilibrated with the ambient environment.

The pressure relief element 73 may comprise a semi-permeable membrane that allows for the ingress and egress of (i.e., the exchange of) specific gases (e.g. oxygen, nitrogen) into the volume defined by the first cavity 65, the second cavity 69 and the rest of the space comprised between the first transparent rigid cover 64 and the second transparent rigid cover 71, while preventing droplets, solid particles and steam to penetrate within it and balancing the pressure within the encapsulated waveguide system with the ambient pressure.

Alternatively, the pressure relief element 73 may comprise a sintered frit performing the same functions as the semi-permeable membrane.

The first transparent rigid cover 64 and second transparent rigid cover 71 are depicted with respect to a user's eye 61, with the first transparent rigid cover 64 being closest to the eye position and the second transparent rigid cover 71 being furthest from the eye position.

Sealing element 62 is applied around the perimeter of the first transparent rigid cover 64 and second transparent rigid cover 71 so as to cover the minor surfaces and a portion of the major surface in proximity to the minor surfaces since the transparent waveguide substrate 66 is smaller than the first transparent rigid cover 64 and second transparent rigid cover 71 in at least one direction e.g., the z-axis direction (See FIG. 4B).

The sealing element 62, the first transparent rigid cover 64 and the second transparent rigid cover 71 may be made of the same material. For instance, the first and second transparent rigid covers may be joined by laser welding or ultrasonic welding, for example, which effectively cause fusing of the materials without the need for glue. Another possibility would involve 3D printing the first and second transparent rigid covers in one single action and depositing the transparent waveguide substrate during the printing process. In some other embodiments, the first cover 64 may be made from material that is different from the material from which the second cover 71 is made. Alternatively, the first and second transparent rigid covers may be joined using a sealing element in the form of but not limited to adhesives including any one or combination of and not limited to pressure sensitive adhesive, cyanoacrylate, UV cured adhesive, epoxy resin, heat seal adhesive or the like.

Sealing element 62 and the first and second transparent rigid covers 64, 71 may not provide a sufficiently resilient encapsulation of the transparent waveguide substrate 66, such that the transparent waveguide substrate may be affected by changes in ambient pressure. To avoid any pressure differential across the transparent waveguide substrate 66 i.e., to avoid having two different pressures in cavities 65, 69, both cavities 65, 69 are connected to each other via the use of discontinuous double-sided adhesive tape gaskets 63, 70. Consequently, the input area 67 and output area 68 are not distorted. (The fluid connection between cavities 65, 69 is insured by using discontinuous double-sided adhesive tape gaskets 63, 70 and the fact that the transparent waveguide substrate 66 is smaller than the first transparent rigid cover 64 and second transparent rigid cover 71 in at least one direction e.g., the z-axis direction (See FIG. 4B).)

The input area 67 and output area 68 may be preferentially located on the proximal major surface of the transparent waveguide substrate, which surface, when the optical system is in use, is nearest the user's eye 61. Alternatively, the input area 67 and output area 68 may be located on the distal major surface of the transparent waveguide substrate, which surface, when the optical system is in use, is furthest from the user's eye 61 or they may be located on opposite major surfaces of, or within, the transparent waveguide substrate, taking advantage of the possibility of using reflective or transmissive areas and the fact that both major surfaces of the transparent waveguide substrate are shielded from the ambient atmosphere.

Figure 14A:
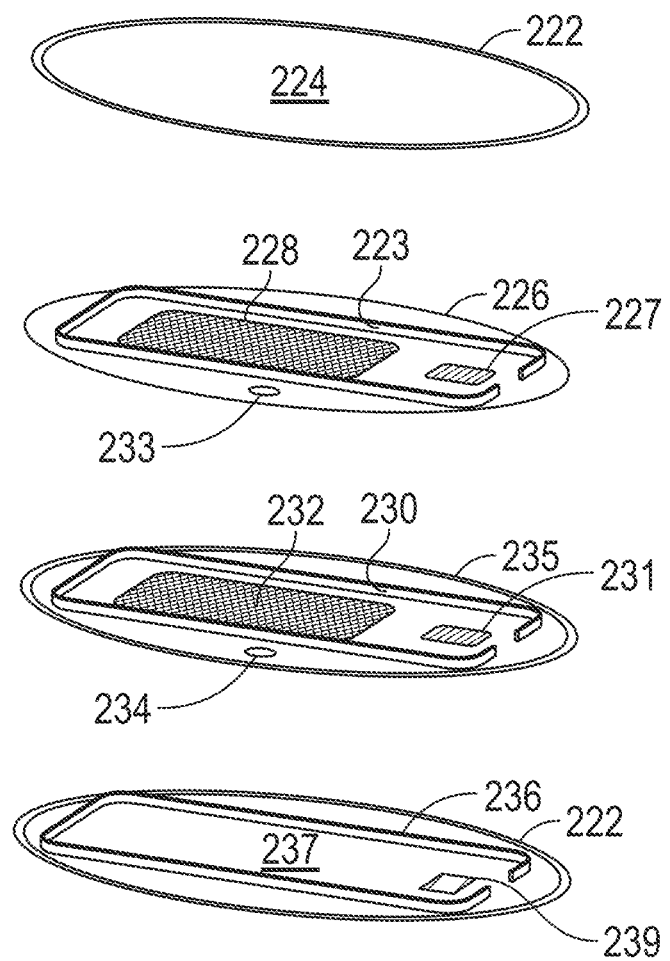
FIG. 14A illustrates an exploded view of an encapsulated waveguide system including a plurality of transparent waveguide substrates according to some embodiments.
Figure 14B:
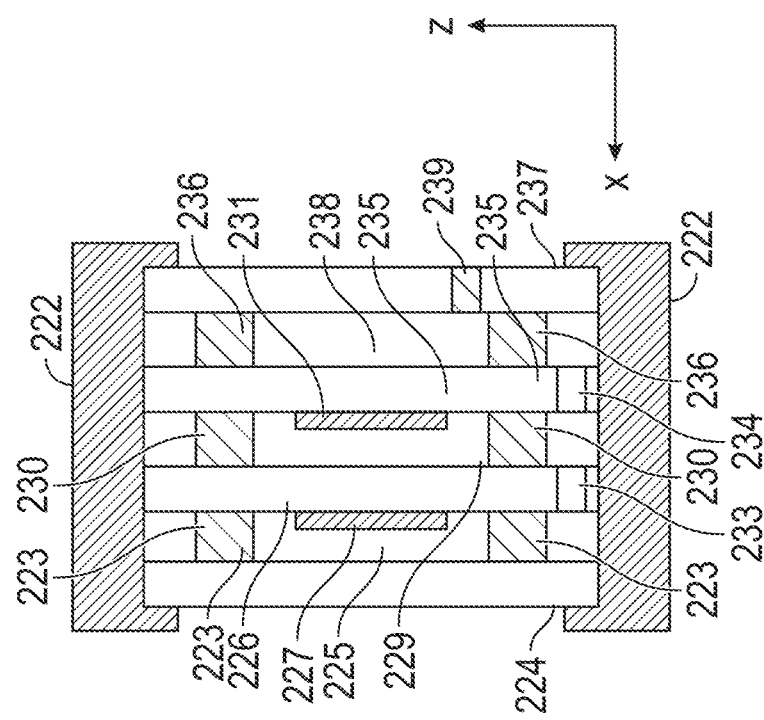
FIG. 14B illustrates a side view of the encapsulated waveguide system of FIG. 14A.

In some other embodiments, a plurality of transparent waveguide substrates rather than a single transparent waveguide substrate may be adopted in the waveguide systems. In some embodiments, a waveguide system is provided that corresponds to any of the waveguide systems of embodiments disclosed herein as having a single substrate but has a plurality of transparent waveguide substrates instead of the single substrate. By way of non-limiting examples, FIG. 14A illustrates an exploded view of an encapsulated waveguide system including a plurality of transparent waveguide substrates separated from one another by spacers according to some embodiments. Components 222-239 in FIG. 14A correspond to elements of the embodiments of encapsulated waveguide systems described in detail above with reference to FIGS. 2A-13, and thus are not again described in detail with reference to FIG. 14A. FIG. 14B illustrates a side view of the encapsulated waveguide system of FIG. 14A. In the embodiment of an encapsulated waveguide system of FIGS. 14A and 14B, the system includes a sealing element 222, a discontinuous double-sided adhesive tape gasket 223 affixing first transparent cover 224 on transparent waveguide substrate 226, a first transparent rigid cover 224, a first cavity 225, a first transparent waveguide substrate 226, an input area 227 of the first transparent waveguide substrate 226, output area 228 of the first transparent waveguide substrate 226, second cavity 229, discontinuous double-sided adhesive tape gasket 230 affixing the first transparent waveguide 226 on the second transparent waveguide substrate 235, input area 231 of second transparent waveguide substrate 235, output area 232 of the second transparent waveguide substrate 232, hole 233 drilled through the first transparent waveguide substrate 226, hole 234 drilled through second transparent waveguide substrate 235, discontinuous double-sided adhesive tape gasket 236 affixing the second transparent waveguide 235 on second transparent rigid cover 237, third cavity 238 and a pressure relief element 239.

Figure 15A:
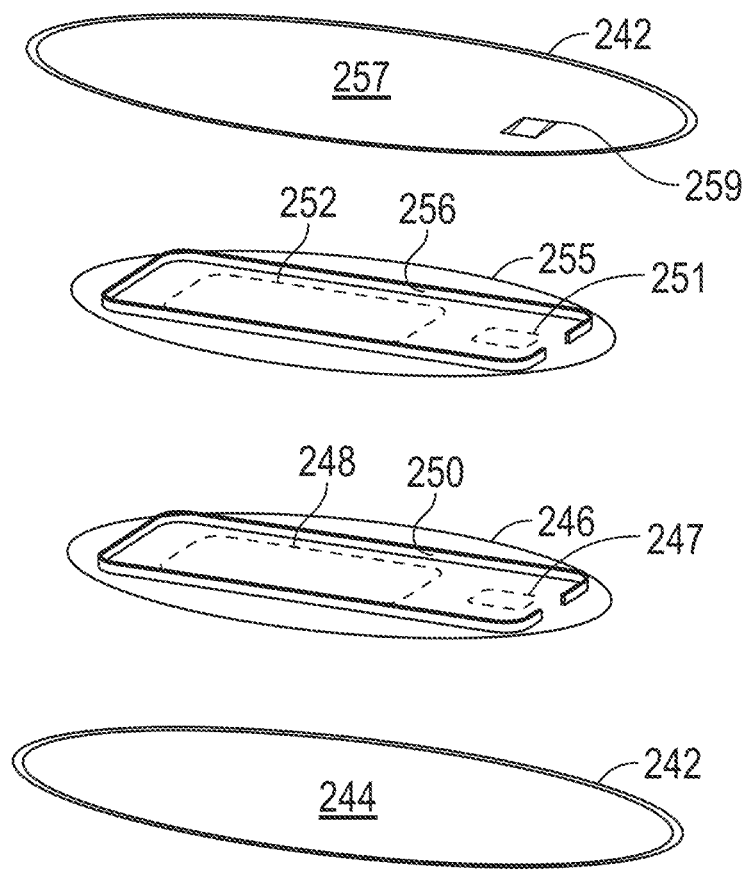
FIG. 15A illustrates an encapsulated waveguide including a plurality of transparent waveguide substrates according to some embodiments.
Figure 15B:
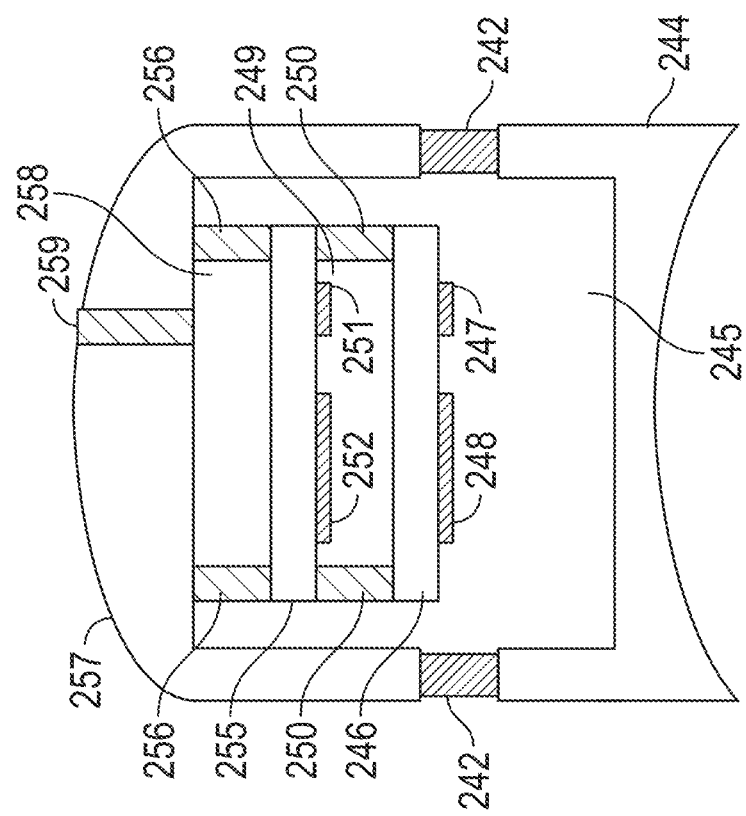
FIG. 15B illustrates a side view of the encapsulated waveguide system of FIG. 15A.

FIG. 15A illustrates an encapsulated waveguide including a plurality of transparent waveguide substrates according to some embodiments. Once again, components 242-259 in FIG. 15A correspond to elements of the embodiments of encapsulated waveguide systems described in detail above with reference to FIGS. 2A-13, and thus are not again described in detail with reference to FIG. 15A. FIG. 15B illustrates a side view of the encapsulated waveguide system of FIG. 15A. In the embodiment of an encapsulated waveguide system of FIGS. 15A and 15B, the system includes sealing element 242, a first transparent rigid cover 244, a first cavity 245, a first transparent waveguide substrate 246, an input area 247 of the first transparent waveguide substrate 246, an output area 248 of the first transparent waveguide substrate, a second cavity 249, a discontinuous double-sided adhesive tape gasket 250 affixing the first transparent waveguide substrate 246 on second transparent waveguide substrate 255, an input area 251 of the second transparent waveguide substrate, an output area 252 of the second transparent waveguide substrate, a discontinuous double-sided adhesive tape gasket 256 affixing the second transparent waveguide 255 on second transparent rigid cover 257, a third cavity, and a pressure relief element 259.

Each of the plurality of transparent waveguide substrates include an input area and an output area. The plurality of transparent waveguide substrates form a waveguide subsystem and are separated or spaced apart from one another. The first, second and third embodiments or other embodiments of the present technology disclosed herein as having a single transparent waveguide may comprise a plurality of transparent waveguide substrates, each possessing an input area and an output area specially designed to interact with a light of given wavelength; each transparent waveguide substrate spaced apart from the other by a spacer such as a double-sided adhesive tape gasket or spacer particles-filled glue (in this respect, the spacer particles may be glass beads of several tens of micrometers).

Additionally, in some embodiments, the plurality of transparent waveguide substrates may be joined using discontinuous double-sided adhesive tape gaskets (or other gap spacing adhesive) to effectively define a connected volume within the encapsulated waveguide system (for example in a similar manner to that used to join the covers and single substrate together in the second and third embodiments shown in FIGS. 3A-3E and 4A-4C).

In one aspect of the present technology, a through aperture is provided in an exterior or external surface of first transparent rigid cover and aligned with the input area of the waveguide system. In some embodiments, the waveguide system corresponds to any one of the first, second, third with respect to FIGS. 2A-2C, 3A-3E, 4A-4C. or any one of the other embodiments disclosed herein (including FIGS. 8A-8B, 9A-9B, 10A-10B and 11A-11B etc.). An aperture (500) (depicted in FIG. 12) is provided in the external surface of first transparent rigid cover (24, 44, 64) aligned with the input area (27, 47, 67). The aperture (not shown) is configured to receive the projector module (20, 40, 60, 80) and orient the projector module (20, 40, 60) with respect to input area (27, 47, 67) such that image bearing light provided by the projector module (20, 40, 60) enters the waveguide at an appropriate angular position to ensure faithful reproduction of the image across the eyebox region (the region over which a user's eye may perceive the projected image) of the output area (28, 48, 68). A viewer looking through an AR module comprising an encapsulated waveguide system according to the present technology is thus able to correctly perceive the information contained in the image bearing light superimposed on the real world. Aperture (500) is further configured to ensure projector (20, 40, 60) is hermetically sealed into the encapsulated waveguide system, thereby maintaining the desired characteristics of the encapsulated transparent waveguide substrate (26, 46, 66) with respect to effects of temperature and pressure.

Aperture (500) thus serves to both optically align projector (20, 40, 60) with input area (27, 47, 67) as well as maintaining the hermetic encapsulation of the transparent waveguide substrate (26, 46, 66).

In yet a further aspect, as depicted in FIG. 13, at least one of the first or second transparent rigid covers disclosed herein with respect to any one of the embodiments of the waveguide system disclosed herein may comprise protrusions (600) intended to locate and secure the encapsulated waveguide system into a frame, such as a prescription spectacle frame. Typically, ophthalmic lenses comprise a raised protrusion around the full perimeter of the lens, which is used to locate and hold the lens in place within the frame. However, due to the fragile nature of the encapsulated waveguide system compared with a standard ophthalmic lens, use of such a continuous protrusion, or glazing bump, may result in damage of the waveguide during insertion of the encapsulated waveguide system into a frame. Accordingly, protrusions 600 are designed to reduce the force required to insert the lens into the frame, while ensuring accurate location of the lens within the frame.

Figure 5A:
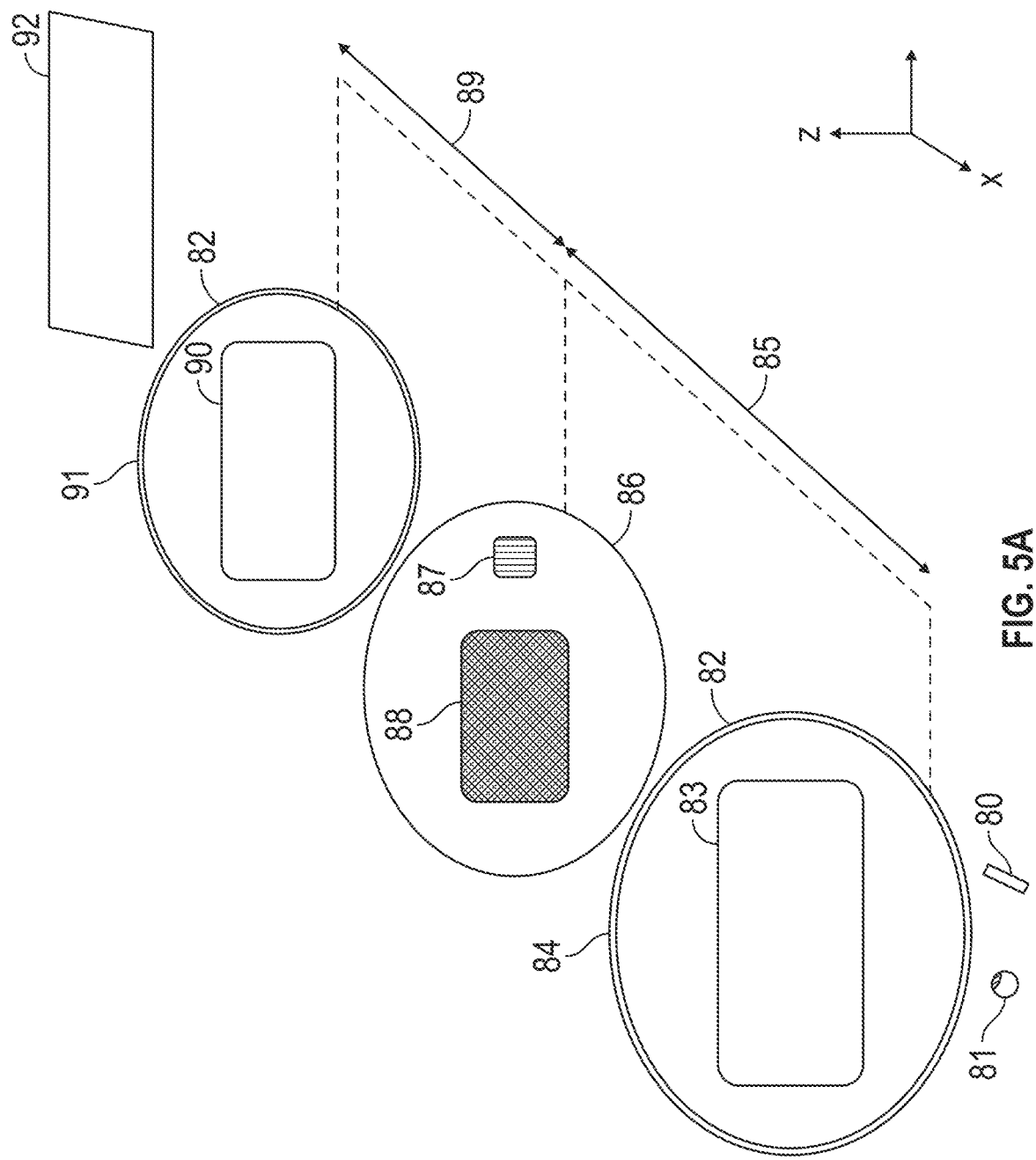
FIG. 5A represents an exploded view of the encapsulated waveguide system according to a fourth embodiment.
Figure 5B:
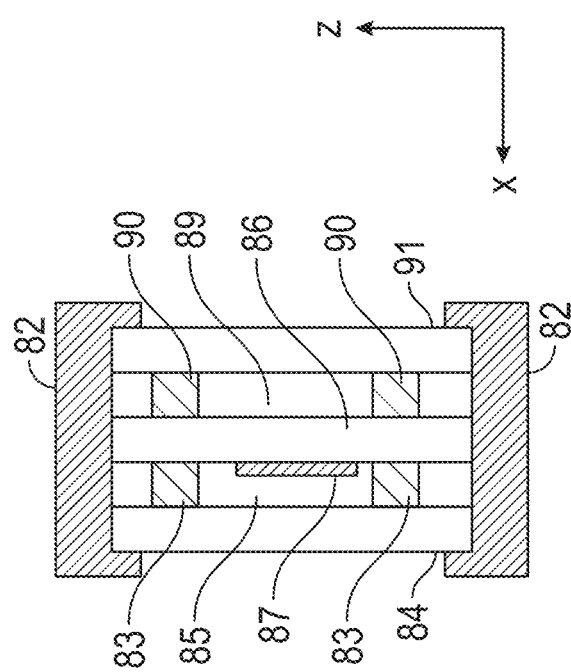
FIG. 5B depicts a cross sectional view of the encapsulated waveguide system according to a fourth embodiment.
Figure 5C:
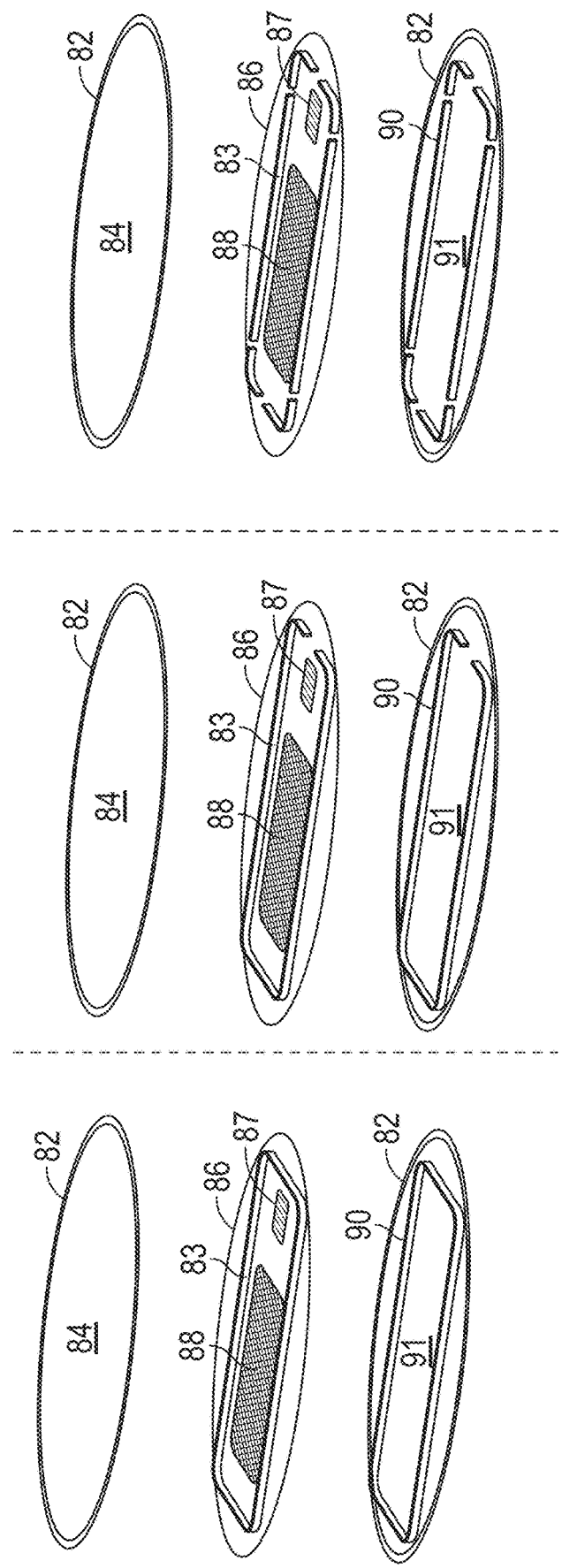
FIG. 5C shows an exploded view of the encapsulated waveguide system according to a fourth embodiment in which different examples of spacers may be adopted.

FIGS. 5A and 5B respectfully depict a schematic exploded view and a side view of an encapsulated waveguide system according to a fourth embodiment of the present technology. The transparent waveguide substrate 86 is arranged between a first outer layer, which in FIG. 5A is the first transparent rigid cover 84, and a second outer layer, which in FIG. 5A is second transparent rigid cover 91. In some other embodiments, such as for virtual reality display systems, the cover 91, which when the optical system is in use, is furthest from the eye (second transparent cover in FIG. 5A), is made opaque rather than transparent (for example by covering with a reflective coating or using non-transparent cover material).

The transparent waveguide is made from an optical transparent material such as but not limited to glass. The transparent waveguide substrate 86 arranged between the first transparent rigid cover 84 and the second transparent rigid cover 91 is hermetically sealed by a sealing element 82. The transparent waveguide substrate 86 is disposed on and spaced apart from the first transparent rigid cover 84 and second transparent rigid cover 91 via one or more spacers. In some embodiments, the transparent waveguide substrate 86 is affixed on and spaced apart from the first transparent rigid cover 84 and second transparent rigid cover 91 cover via double-sided adhesive tape gaskets 83, 90, respectively (See FIG. 5C). In some embodiments, spacers, other than gaskets may be adopted. In some embodiments the gaskets or other spacers are discontinuous whilst in some other embodiments the gaskets or other spacers are continuous.

This arrangement results in the formation of two air cavities 85, 89 spaced apart from the transparent waveguide substrate 86. The transparent waveguide substrate 86 has the same length as the first transparent rigid cover 84 and second transparent rigid cover 91 in at least one direction e.g., the z-axis direction (See FIG. 5B). The transparent waveguide substrate 86 comprises an input area 87 and an output area 88 on its major surface facing the user's eye 81 and the projector module 80. The input area 87 and output area 88 are diffractive optical nanostructures such as gratings, surface relief gratings or holographic optical elements. In some embodiments, the input area 87 and/or output area 88 may be other types of input area and/or output area used in near eye waveguide systems.

The first transparent rigid cover 84 and second transparent rigid cover 91 are depicted with respect to a user's eye 81, with the first transparent rigid cover 84 being closest to the eye position and the second transparent rigid cover 91 being furthest from the eye position.

Sealing element 82 is applied to the minor surfaces of the first and second transparent rigid covers and a portion of the major surface in proximity to the minor surfaces since the transparent waveguide substrate 86 has the same length as the first transparent rigid cover 84 and second transparent rigid cover 81 in at least one direction e.g., the z-axis direction (See FIG. 5B).

The sealing element 82, the first transparent rigid cover 84 and the second transparent rigid cover 91 may be made of the same material. The first and second transparent rigid covers 84, 91 may be joined together by laser welding or ultrasonic welding, which effectively causes fusing of the materials without the need for glue. Another possibility would involve 3D printing the first and second transparent rigid covers in one single action and depositing the transparent waveguide substrate during the printing process. In some other embodiments, the first cover 84 may be made from material that is different from the material from which the second cover 91 is made.

Alternatively, the first and second transparent rigid covers may be joined using a sealing element in the form of but not limited to adhesives including any one or combination of and not limited to pressure sensitive adhesive, cyanoacrylate, UV cured adhesive, epoxy resin, heat seal adhesive or the like. Sealing element 82 and the first and second transparent rigid covers 84, 91 may provide a sufficiently resilient encapsulation of the transparent waveguide substrate 86, such that the latter is unaffected by changes in ambient pressure. In other words, there is no pressure differential across the transparent waveguide substrate 86 i.e., the respective pressures in cavities 85, 89 are identical. Therefore, the input area 87 and output area 88 of the transparent waveguide substrate are not distorted. The fourth embodiment of the present technology is thus insensitive to the environmental conditions of the ambient atmosphere e.g., dust, particulate debris, moisture, ambient pressure.

The input area 87 and output area 88 may be preferentially located on the proximal major surface of the transparent waveguide substrate, which surface, when the optical system is in use, is nearest the user's eye 81. Alternatively, the input area 87 and output area 88 may be located on the distal major surface of the transparent waveguide substrate, which surface, when the optical system is in use, is furthest from the user's eye 41 or they may be located on opposite major surfaces of, or within, the transparent waveguide substrate, taking advantage of the possibility of using reflective or transmissive areas and the fact that both major surfaces of the transparent waveguide substrate are shielded from the ambient atmosphere.

Figure 6A:
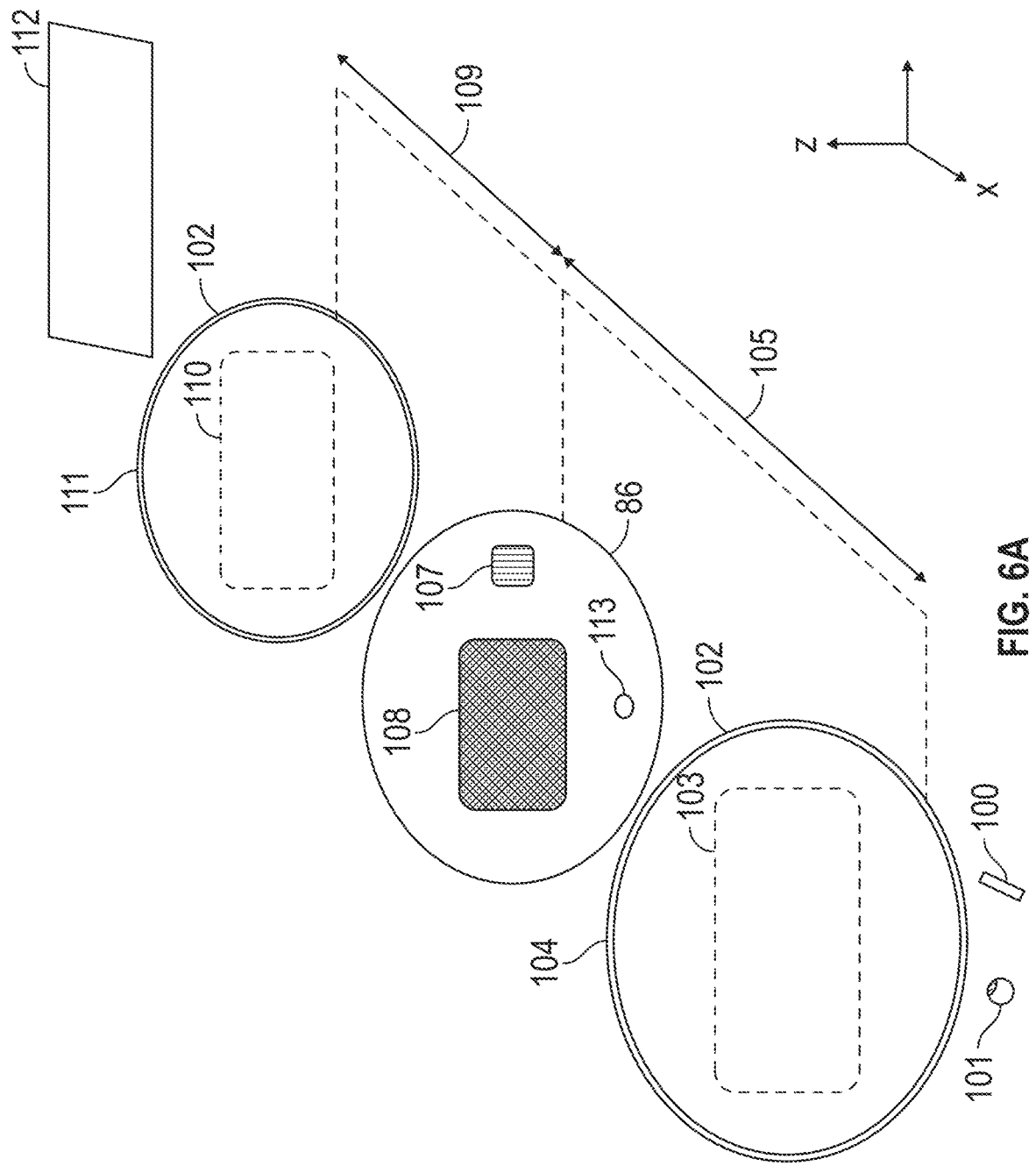
FIG. 6A represents an exploded view of the encapsulated waveguide system according to a fifth embodiment.
Figure 6B:
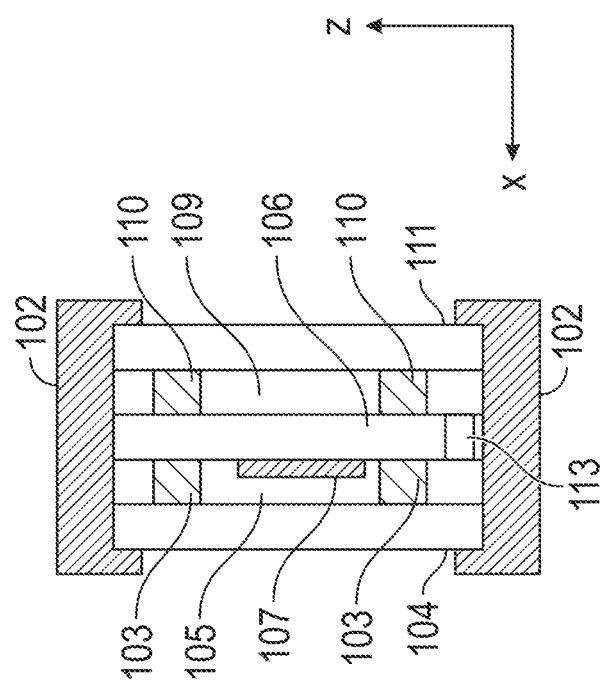
FIG. 6B depicts a cross sectional view of the encapsulated waveguide system according to a fifth embodiment.
Figure 6C:
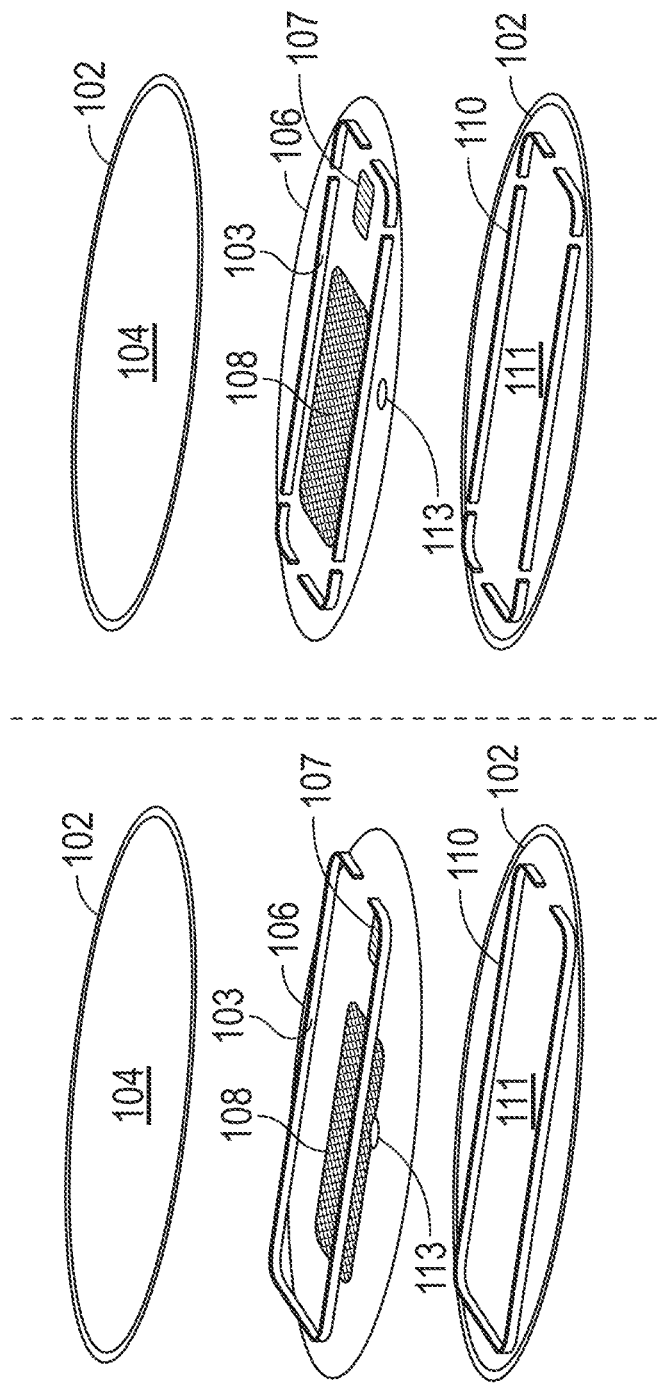
FIG. 6C shows an exploded view of the encapsulated waveguide system according to a fifth embodiment in which different examples of spacers may be adopted.

FIGS. 6A and 6B, respectfully, depict a schematic exploded view and side view of an encapsulated waveguide system according to a fifth embodiment of the present technology. The transparent waveguide substrate 106 is arranged between a first outer layer, which in FIG. 6A is the first transparent rigid cover 104, and a second outer layer, which in FIG. 6A is second transparent rigid cover 111 via one or more spacers. In some other embodiments, such as for virtual reality display systems, the cover 111, which when the optical system is in use, is furthest from the eye (second transparent cover in FIG. 2A) is made opaque rather than transparent (for example by covering with a reflective coating or using non-transparent cover material). A viewer's surroundings 112 may also be seen by a user's eye 101 in embodiments where the second transparent cover 111 is transparent. The transparent waveguide is made from an optical transparent material such as but not limited to glass. The transparent waveguide substrate 106 arranged between the first transparent rigid cover 104 and the second transparent rigid cover 111 is hermetically sealed by a sealing element 102. The substrate 106 is disposed on and spaced apart from the first transparent rigid cover 104 and second transparent rigid cover 111. In some embodiments, the transparent waveguide substrate 106 is affixed on and spaced apart from the first transparent rigid cover 104 and second transparent rigid cover 111 cover via discontinuous double-sided adhesive tape gaskets 103, 110, respectively (See FIG. 6C). In some embodiments, spacers other than gaskets may be adopted. This arrangement results in the formation of two air (or fluid) cavities 105, 109 spaced apart from the transparent waveguide substrate 106. The transparent waveguide substrate 106 has the same length as the first transparent rigid cover 104 and second transparent rigid cover 111 in at least one direction e.g., the z-axis direction (See FIG. 6B). The transparent waveguide substrate 106 may exhibit a hole 113 or other passageway (formed for example by drilling through the substrate) in order to connect the first cavity 105 and second cavity 109. The passageway extending through the transparent waveguide substrate 106 is configured to enable pressure equilibrium around the waveguide. The transparent waveguide substrate 106 comprises an input area 107 and an output area 108 on its major surface facing the user's eye 101 and the projector module 100. The input area 107 and output area 108 are diffractive optical nanostructures such as gratings, surface relief gratings or holographic optical elements. In some embodiments, the input area 107 and/or output area 108 may be other types of input area and/or output area used in near eye waveguide systems.

The first transparent rigid cover 104 and second transparent rigid cover 111 are depicted with respect to a user's eye 101, with the first transparent rigid cover 104 being closest to the eye position and the second transparent rigid cover 111 being furthest from the eye position.

Sealing element 102 is applied to the minor surfaces of the first and second transparent rigid covers and a portion of the major surface in proximity to the minor surfaces since the transparent waveguide substrate 106 has the same length as the first transparent rigid cover 104 and second transparent rigid cover 111 in at least one direction e.g., the z-axis direction (See FIG. 6B).

The sealing element 102, the first transparent rigid cover 104 and the second transparent rigid cover 111 may be made of the same material. The first and second transparent rigid covers 104, 111 may be joined laser welding or ultrasonic welding, which effectively cause fusing of the materials without the need for glue. Another possibility would involve 3D printing the first and second transparent rigid covers in one single action and depositing the transparent waveguide substrate during the printing process. In some other embodiments, the first cover 104 may be made from material that is different from the material from which the second cover 111 is made. In some embodiments, the 3D printing process also produces or fabricates one of the first and second transparent rigid covers 104, 111 as an ophthalmic lens.

Alternatively, the first and second transparent rigid covers may be joined using a sealing element in the form of but not limited to adhesives including any one or combination of and not limited to pressure sensitive adhesive, cyanoacrylate, UV cured adhesive, epoxy resin, heat seal adhesive or the like. Sealing element 102 and the first and second transparent rigid covers 104, 111 may not provide a sufficiently resilient encapsulation of the transparent waveguide substrate 106, such that the transparent waveguide substrate may be affected by changes in ambient pressure. To avoid any pressure differential across the transparent waveguide substrate 106 i.e., to avoid having two different pressures in cavities 105, 109, both cavities 105, 109 are connected to each other via the hole 113 or other passageway drilled through the transparent waveguide substrate 106 (See FIG. 6B). Consequently, the input area 87 and output area 88 are not distorted.

The input area 107 and output area 108 may be preferentially located on the proximal major surface of the transparent waveguide substrate, which surface, when the optical system is in use, is nearest the user's eye 101. Alternatively, the input area 107 and output area 108 may be located on the distal major surface of the transparent waveguide substrate, which surface, when the optical system is in use, is furthest from the user's eye 101 or they may be located on opposite major surfaces of, or within, the transparent waveguide substrate, taking advantage of the possibility of using reflective or transmissive areas and the fact that both major surfaces of the transparent waveguide substrate are shielded from the ambient atmosphere.

Figure 7A:
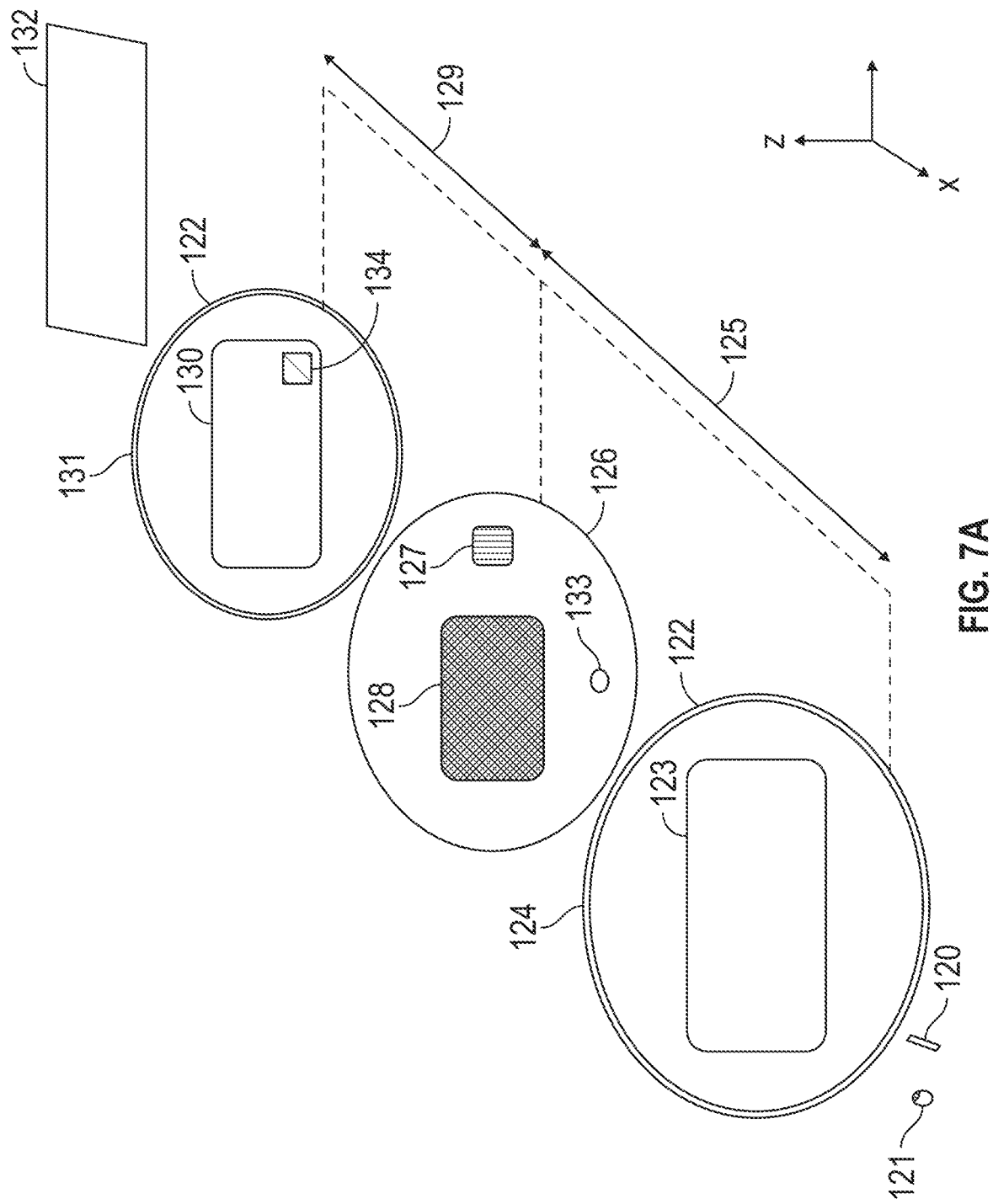
FIG. 7A represents an exploded view of the encapsulated waveguide system according to a sixth embodiment.
Figure 7B:
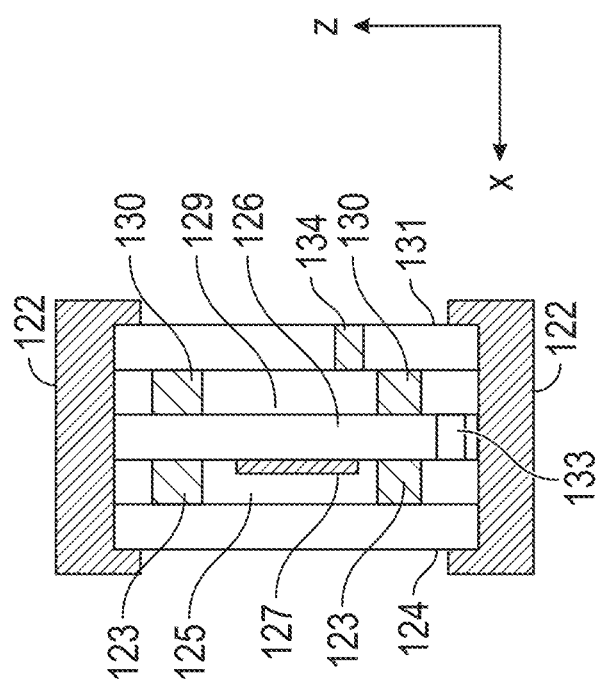
FIG. 7B depicts a cross sectional view of the encapsulated waveguide system according to a sixth embodiment.

FIGS. 7A and 7B respectfully depict a schematic exploded view and side view of an encapsulated waveguide system according to a sixth embodiment of the present technology. The transparent waveguide substrate 126 is arranged between a first outer layer, which in FIG. 7A is the first transparent rigid cover 124, and a second outer layer, which in FIG. 7A is second transparent rigid cover 131. In some other embodiments, such as for virtual reality display systems, the cover 131, which when the optical system is in use, is furthest from the eye (second transparent cover in FIG. 7A), is made opaque rather than transparent (for example by covering with a reflective coating or using non-transparent cover material). A viewer's surroundings 132 may also be seen by user's eye 121 in embodiments where the second transparent cover 131 is transparent. In some embodiments, the first and/or second outer layers are ophthalmic lenses. Each ophthalmic lens is, in some embodiments, prepared using a standard ophthalmic lens blank. Each ophthalmic lens is, in some embodiments, prepared using a standard laboratory milling machine.

The transparent waveguide is made from an optical transparent material such as but not limited to glass. The transparent waveguide substrate 126 arranged between the first transparent rigid cover 124 and the second transparent rigid cover 131 is hermetically sealed by a sealing element 122. The substrate 126 is disposed on and spaced apart from the first transparent rigid cover 124 and second transparent rigid cover 131 via one or more spacers. In some embodiments, the transparent waveguide substrate 126 is affixed on and spaced apart from the first transparent rigid cover 124 and second transparent rigid cover 131 cover via discontinuous double-sided adhesive tape gaskets 123, 130, respectively (See FIG. 7C) to effectively define a connected volume within the encapsulated waveguide system. In some embodiments, spacers other than gaskets may be adopted. This arrangement results in the formation of two air cavities 125, 129 spaced apart from the transparent waveguide substrate 106. The transparent waveguide substrate 126 has the same length as the first transparent rigid cover 124 and second transparent rigid cover 131 in at least one direction e.g., the z-axis direction (See FIG. 7B). The transparent waveguide substrate 126 may exhibit a hole 133 or other passageway (for example drilled through the substrate) in order to connect the first cavity 125 and second cavity 129. The passageway extending through the transparent waveguide substrate is configured to enable pressure equilibrium around the waveguide.

Figure 7C:
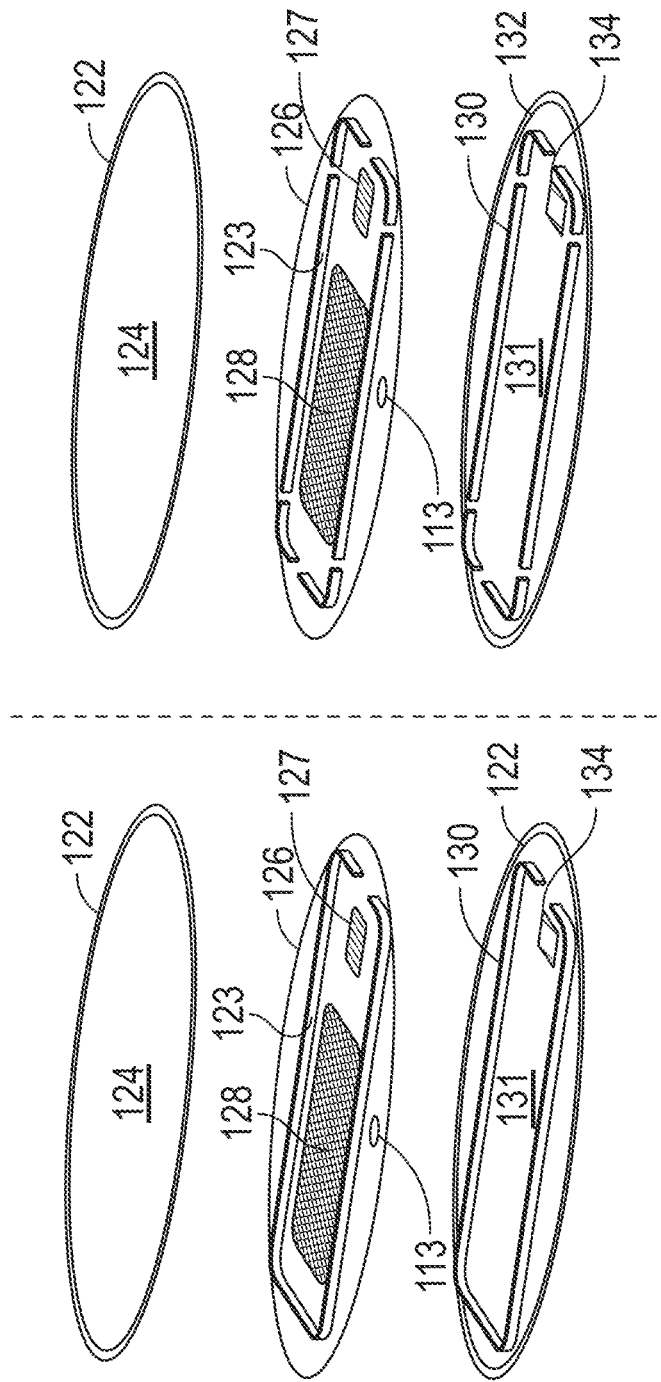
FIG. 7C shows an exploded view of the encapsulated waveguide system according to a sixth embodiment in which different examples of spacers may be adopted.

A pressure relief element 134 is configured to balance pressure between the volume defined by the first cavity 125, the second cavity 129 and the rest of the space comprised between the first transparent rigid cover 124 and the second transparent rigid cover 131, and the ambient atmosphere may be located on or in a major surface of one of the transparent rigid covers 124, 131 (See FIG. 7A-7C). The pressure relief element 134 may mitigate ingress of debris and moisture, while ensuring the pressure within the encapsulated waveguide is equilibrated with the ambient environment.

The pressure relief element 134 may comprise either a semi-permeable membrane that allows for the ingress and egress of specific gases (e.g. oxygen, nitrogen) into the volume defined by the first cavity 125, the second cavity 129 and the rest of the space comprised between the first transparent rigid cover 124 and the second transparent rigid cover 131, while preventing droplets, solid particles and steam to penetrate within it and balancing the pressure within the encapsulated waveguide system and the ambient pressure. Alternatively, the pressure relief element 134 may comprise a sintered frit performing the same functions as the semi-permeable membrane.

The transparent waveguide substrate 126 comprises an input area 127 and an output area 128 on its major surface facing the user's eye 121 and the projector module 120. The input area 127 and output area 128 are diffractive optical nanostructures such as gratings, surface relief gratings or holographic optical elements. In some embodiments, the input area 127 and/or output area 128 may be other types of input area and/or output area used in near eye waveguide systems.

The first transparent rigid cover 124 and second transparent rigid cover 131 are depicted with respect to a user's eye 121, with the first transparent rigid cover 124 being closest to the eye position and the second transparent rigid cover 131 being furthest from the eye position.

Sealing element 122 is applied to the minor surfaces of the first and second transparent rigid covers and a portion of the major surface in proximity to the minor surfaces since the transparent waveguide substrate 126 has the same length as the first transparent rigid cover 124 and second transparent rigid cover 131 in at least one direction e.g., the z-axis direction (See FIG. 7B).

The sealing element 122, the first transparent rigid cover 124 and the second transparent rigid cover 131 may be made of the same material. For instance, the first and second transparent rigid covers 124, 131 may be joined using laser welding or ultrasonic welding, which effectively cause fusing of the materials without the need for glue. Another possibility would involve 3D printing the first and second transparent rigid covers in one single action and depositing the transparent waveguide substrate during the printing process. In some other embodiments, the first cover 124 may be made from material that is different from the material from which the second cover 131 is made. Alternatively, the first and second transparent rigid covers may be joined using a sealing element in the form of but not limited to adhesives including any one or combination of and not limited to pressure sensitive adhesive, cyanoacrylate, UV cured adhesive, epoxy resin, heat seal adhesive or the like.

Sealing element 122 and the first and second transparent rigid covers 124, 131 may not provide a sufficiently resilient encapsulation of the transparent waveguide substrate 126, such that the transparent waveguide substrate may be affected by changes in ambient pressure. To avoid any pressure differential across the transparent waveguide substrate 126 i.e., to avoid having two different pressures in cavities 125, 129, both cavities 125, 129 are connected to each other via the hole or other passageway 133 drilled through the transparent waveguide substrate 126 (See FIG. 7B). Consequently, the input area 127 and output area 128 are not distorted.

The input area 127 and output area 128 may be preferentially located on the proximal major surface of the transparent waveguide substrate, which surface, when the optical system is in use, is nearest the user's eye 121. Alternatively, the input area 127 and output area 128 may be located on the distal major surface of the transparent waveguide substrate, which surface, when the optical system is in use, is furthest from the user's eye 121 or they may be located on opposite major surfaces of, or within, the transparent waveguide substrate, taking advantage of the possibility of using reflective or transmissive areas and the fact that both major surfaces of the transparent waveguide substrate are shielded from the ambient atmosphere.

As already indicated hereinbefore, any one of the embodiments the fourth, fifth and sixth embodiments of the present technology may comprise a single transparent waveguide substrate, or may comprise a plurality of transparent waveguide substrates each possessing an input area and output area that are specially designed to interact with a light of given wavelength; each transparent waveguide substrate spaced apart from the other by a double-sided adhesive tape gasket or spacer particles-filled glue (in this respect, the spacer particles may be glass beads of several tens of micrometers).

Additionally, in the fourth and fifth embodiments, the plurality of transparent waveguide substrates may be joined using discontinuous double-sided adhesive tape gaskets (or other gap spacing adhesive) and be provided with a hole through them, to effectively define a connected volume within the encapsulated waveguide system.

In one aspect, with respect to the fourth, fifth and sixth embodiments described with respect to FIGS. 5A-5C, 6A-6C, 7A-7C, an aperture (500) (depicted in FIG. 12) is provided in the external surface of first transparent rigid cover (84, 104, 124) aligned with the input area (87, 107, 127). The aperture (500) is configured to receive the projector module (80, 100, 120) and orient the projector module (20, 40, 60) with respect to input area (87, 107, 127) such that image bearing light provided by the projector module (80, 100, 120) enters the waveguide at an appropriate angular position to ensure faithful reproduction of the image across the eyebox region (the region over which a user's eye may perceive the projected image) of the output area (88, 108, 128). A viewer looking through an AR module comprising an encapsulated waveguide system according to the present technology is thus able to correctly perceive the information contained in the image bearing light superimposed on the real world. Aperture (not shown) is further configured to ensure projector (80, 100, 120) is hermetically sealed into the encapsulated waveguide system, thereby maintaining the desired characteristics of the encapsulated transparent waveguide substrate (86, 106, 126) with respect to effects of temperature and pressure.

Aperture (500) thus serves to both optically align projector (80, 100, 120) with input area (87, 107, 127) as well as maintaining the hermetic encapsulation of the transparent waveguide substrate (26, 46, 66).

In yet a further aspect, as depicted in FIG. 13, at least one of the first or second transparent rigid covers may comprise protrusions (600) intended to locate and secure the encapsulated waveguide system into a frame, such as a prescription spectacle frame. Typically, ophthalmic lenses comprise a raised protrusion around the full perimeter of the lens, which is used to locate and hold the lens in place within the frame. However, due to the fragile nature of the encapsulated waveguide system compared with a standard ophthalmic lens, use of such a continuous protrusion, or glazing bump, may result in damage of the waveguide during insertion of the encapsulated waveguide system into a frame. Accordingly, protrusions 600 are designed to reduce the force required to insert the lens into the frame, while ensuring accurate location of the lens within the frame. The protrusions 600, which are discrete glazing bumps in some embodiments, reduce the force required to insert or fix the encapsulated waveguide system into a frame.

The utilization of push/pull lenses, such as for example described in U.S. Pat. No. 10,007,115 provide a means of modulating the focal plane of image information displayed in the waveguide, without compromising the view of the real world through the waveguide system. In certain aspects of the present technology as described with reference to FIGS. 2A-2C, 3A-3E, 4A-4C, 5A-5C, 6A-6C and 7A-7C, the encapsulated waveguide system may be provided in a configuration which comprises a push/pull lens configuration (as shown in FIGS. 8A-8B, 9A-9B, 10A-10B, 11A-11B) intended to alter the focal distance at which the projected image is perceived. In such a configuration first transparent rigid cover may be provided as a push lens and second transparent rigid cover may be provided as a pull lens, such that the rigid covers work together to modulate the focal distance of the projected image. Additionally, the push and pull lenses may be configured to provide the same pressure-controlled cavity surrounding the waveguide as described herein above.

Figure 8A:
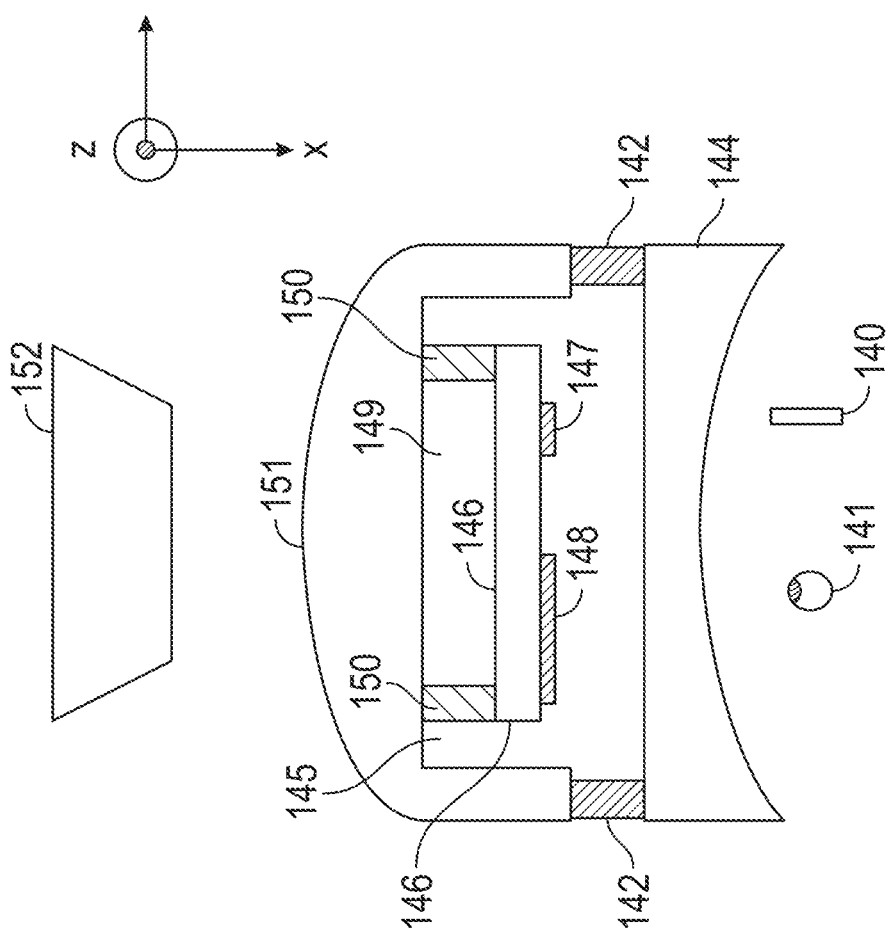
FIG. 8A shows a cross sectional view of the encapsulated waveguide system according to a seventh embodiment.
Figure 8B:
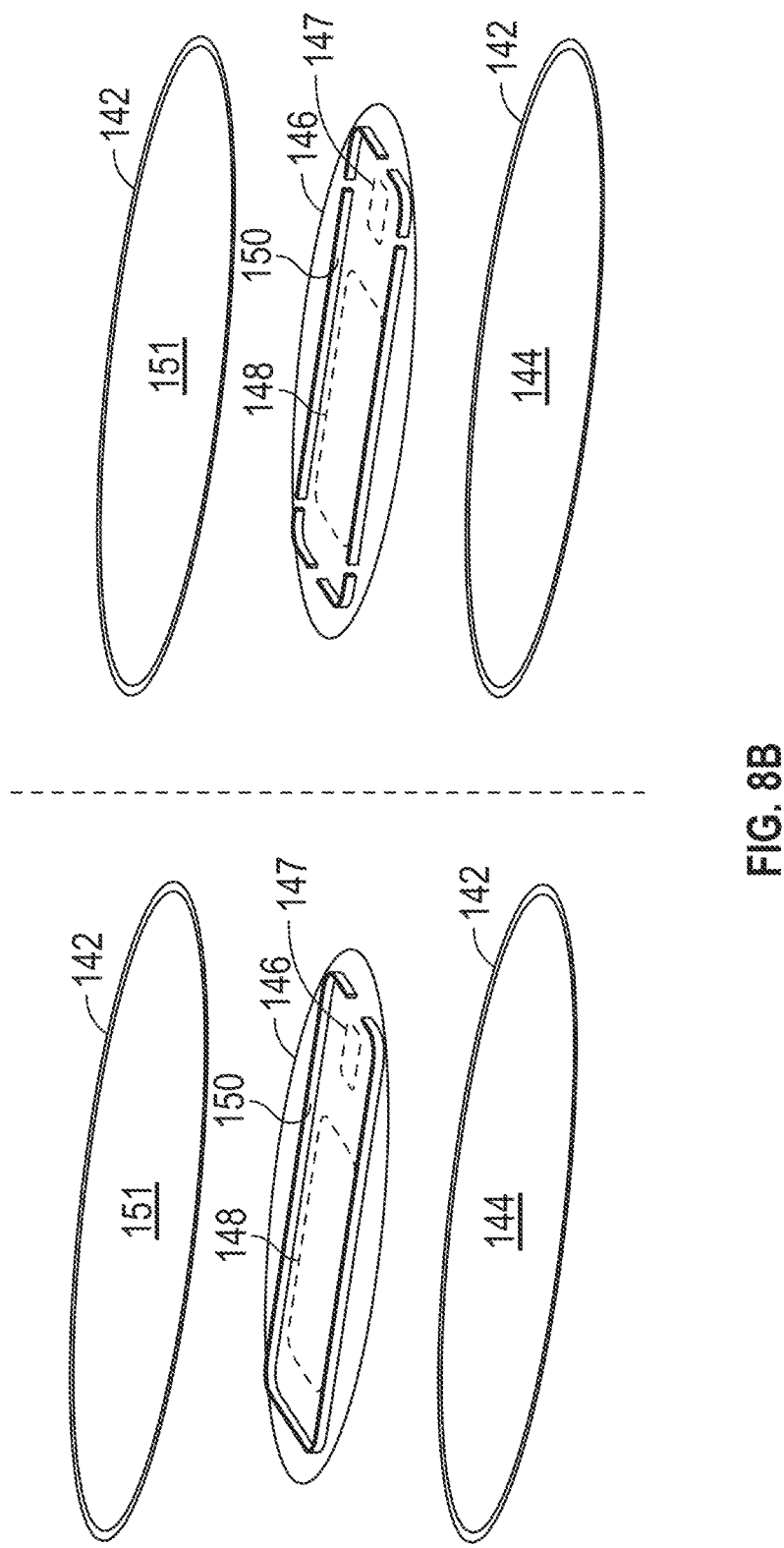
FIG. 8B represents shows an exploded view of the encapsulated waveguide system according to a seventh embodiment in which different examples of spacers may be adopted.

FIG. 8A shows a cross sectional view of the encapsulated waveguide system according to a seventh embodiment of the technology. The transparent waveguide substrate 146 is arranged between a first outer layer, which in FIG. 8A is the first transparent rigid cover 144, and a second outer layer, which in FIG. 8A is second transparent rigid cover 151. The first and second transparent rigid covers 144, 151 are a pull lens and a push lens, respectively. The transparent waveguide substrate 146 is smaller than the first transparent rigid cover 144 and second transparent rigid cover 151 in every considered direction i.e., the x-axis, y-axis and z-axis directions. In some other embodiments, such as for virtual reality display systems, the cover 151, which when the optical system is in use, is furthest from the eye (second transparent cover in FIG. 8A), is made opaque rather than transparent (for example by covering with a reflective coating or using non-transparent cover material).

The transparent waveguide is made from an optical transparent material such as but not limited to glass. The substrate 146 is disposed on and spaced apart from the second transparent rigid cover 151 and first transparent rigid cover 144 via one or more spacers. The transparent waveguide substrate 146 arranged between the first transparent rigid cover 144 and the second transparent rigid cover 151 is hermetically sealed by a sealing element 142. In some embodiments, the transparent waveguide substrate 146 is affixed on and spaced apart from the second transparent rigid cover 151 via a discontinuous double-sided adhesive tape gasket 150 (See FIG. 8B). In some embodiments, a spacer other than the gasket may be adopted.

The major surface of the second transparent rigid cover 151 facing away from the viewer's surroundings 152 may present a pocket for accommodating the transparent waveguide substrate 146 and to have it sufficiently spaced apart from the first transparent rigid cover 144 to avoid any optical interaction between them. The cavities 145 and 149 are connected to each other via discontinuous double-sided adhesive tape gasket 150 and form thus a single cavity.

The transparent waveguide substrate 126 comprises an input area 147 and an output area 148 on its major surface facing the user's eye 141 and the projector module 140. The input area 147 and output area 148 are diffractive optical nanostructures such as gratings, surface relief gratings or holographic optical elements. In some embodiments, the input area 147 and/or output area 148 may be other types of input area and/or output area used in near eye waveguide systems.

Figure 9A:
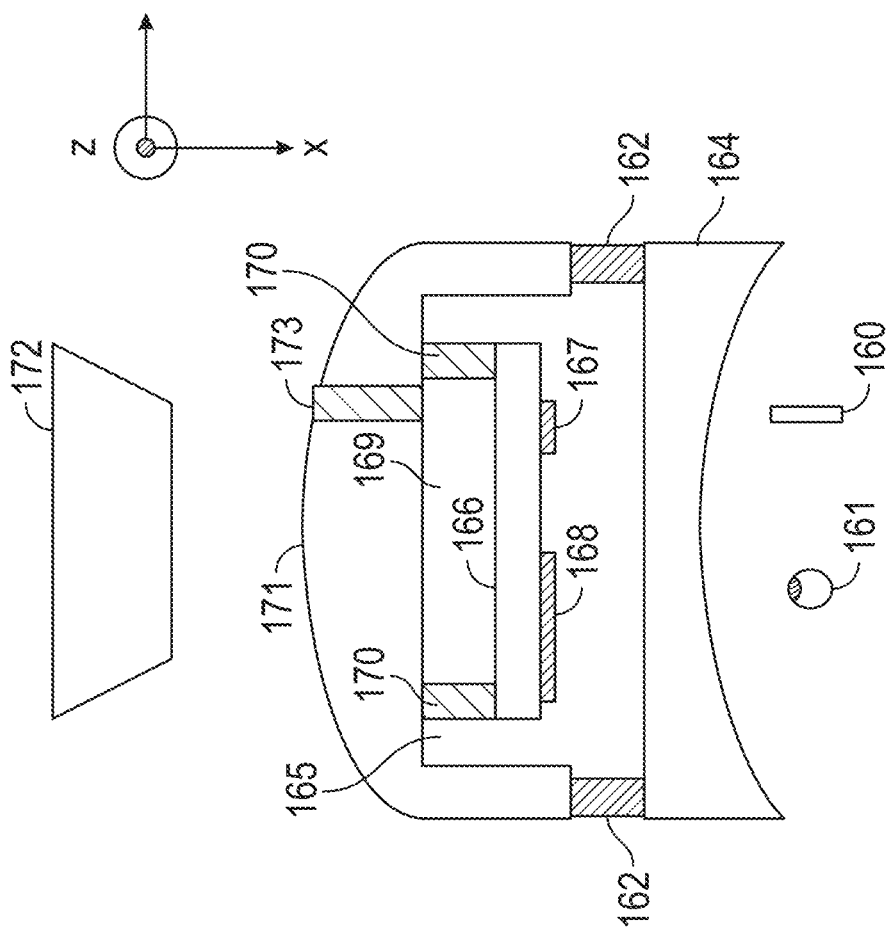
FIG. 9A depicts a cross sectional view of the encapsulated waveguide system according to an eighth embodiment.
Figure 9B:
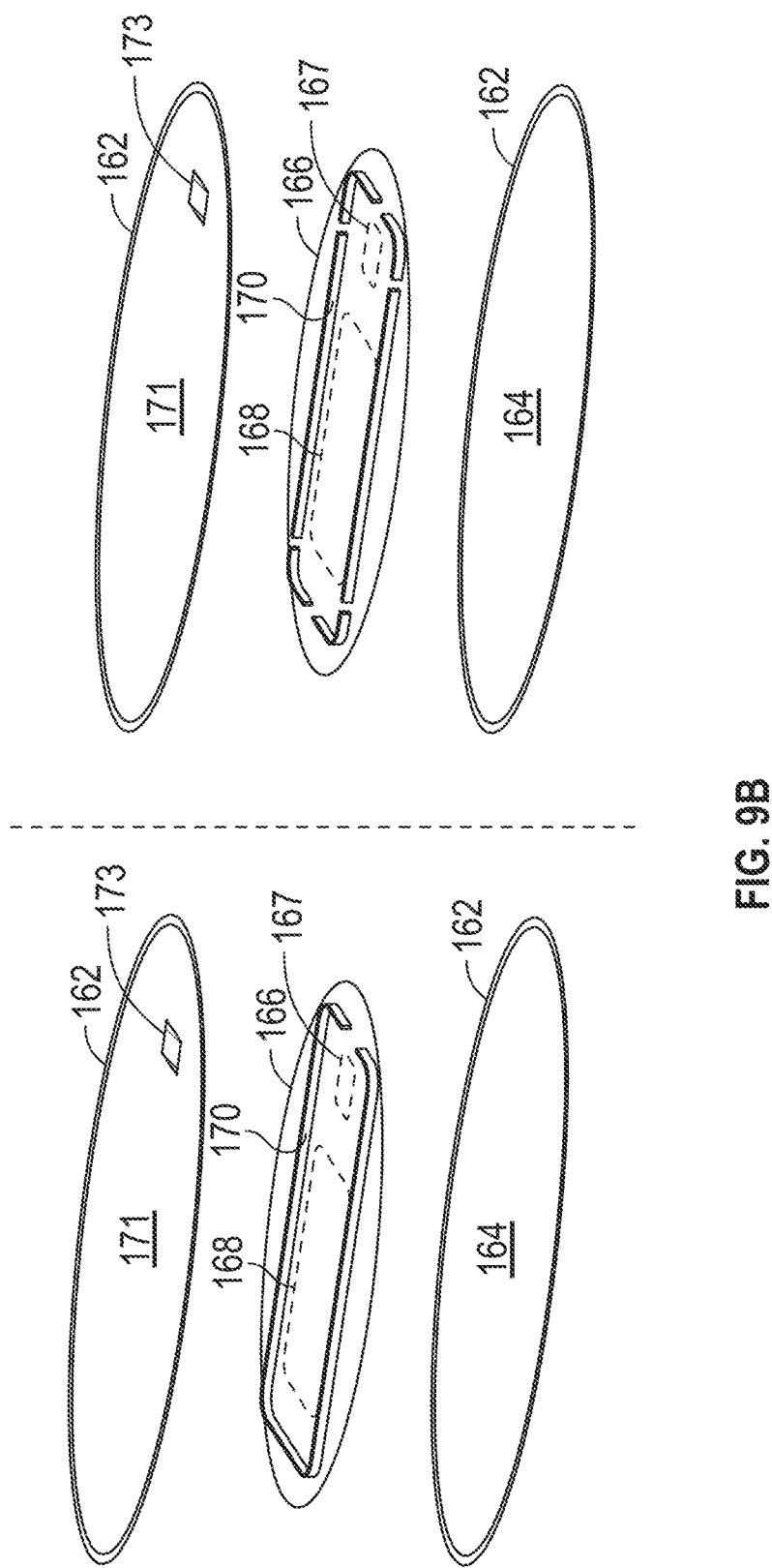
FIG. 9B represents shows an exploded view of the encapsulated waveguide system according to an eighth embodiment in which different examples of spacers may be adopted.

FIG. 9A shows a cross sectional view of the encapsulated waveguide system according to an eighth embodiment of the technology. The transparent waveguide substrate 166 is arranged between a first outer layer, which in FIG. 9A is the first transparent rigid cover 164, and a second outer layer, which in FIG. 9A is second transparent rigid cover 171. The first and second transparent rigid covers 164, 171 are a pull lens and a push lens, respectively. In some other embodiments, such as for virtual reality display systems, the cover 171, which when the optical system is in use, is furthest from the eye (second transparent cover in FIG. 9A). is made opaque rather than transparent (for example by covering with a reflective coating or using non-transparent cover material).

The transparent waveguide is made from an optical transparent material such as but not limited to glass. The transparent waveguide substrate 166 is smaller than the first transparent rigid cover 164 and second transparent rigid cover 171 in every considered direction i.e., the x-axis, y-axis and z-axis directions.

The substrate 166 is disposed on and spaced apart from the second transparent rigid cover 171 and first transparent rigid cover 164 via one or more spacers. The transparent waveguide substrate 166 arranged between the first transparent rigid cover 164 and the second transparent rigid cover 171 is hermetically sealed by a sealing element 162. In some embodiments, the transparent waveguide substrate 166 is affixed on and spaced apart from the second transparent rigid cover 171 via a discontinuous double-sided adhesive tape gasket 150 (See FIG. 9B). In some embodiments, a spacer other than a gasket may be adopted.

The major surface of the second transparent rigid cover 171 facing away from the viewer's surroundings 172 may present a pocket for accommodating the transparent waveguide substrate 166 and to have it sufficiently spaced apart from the first transparent rigid cover 164 to avoid any optical interaction between them. The cavities 165 and 169 are connected to each other via the discontinuous double-sided adhesive tape gasket 170 and form thus a single cavity.

The transparent waveguide substrate 166 comprises an input area 167 and an output area 168 on its major surface facing the user's eye 161 and the projector module 160. The input area 167 and output area 168 are diffractive optical nanostructures such as gratings, surface relief gratings or holographic optical elements. In some embodiments, the input area 167 and/or output area 168 may be other types of input area and/or output area used in near eye waveguide systems.

A pressure relief element 173 is configured to balance pressure between the single cavity formed by cavities 165, 169 and the ambient atmosphere and may be located on or in a major surface of one of the transparent rigid covers 164, 171.

Figure 10A:
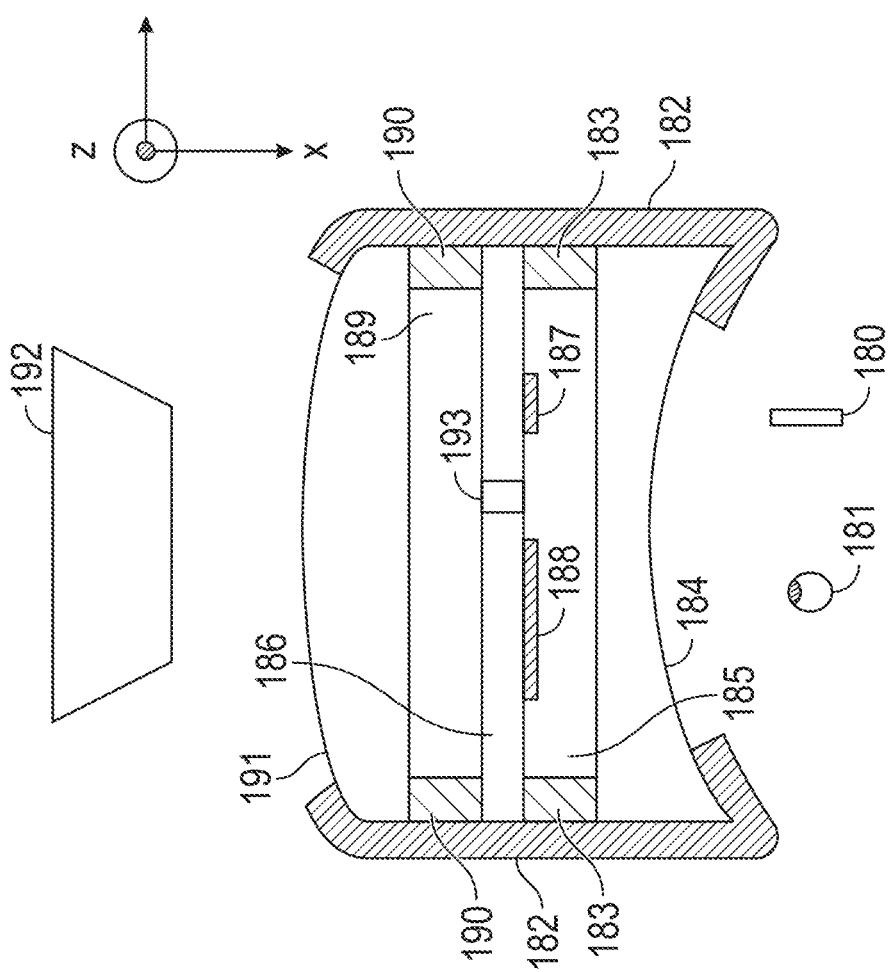
FIG. 10A represents a cross sectional view of the encapsulated waveguide system according to a ninth embodiment.
Figure 10B:
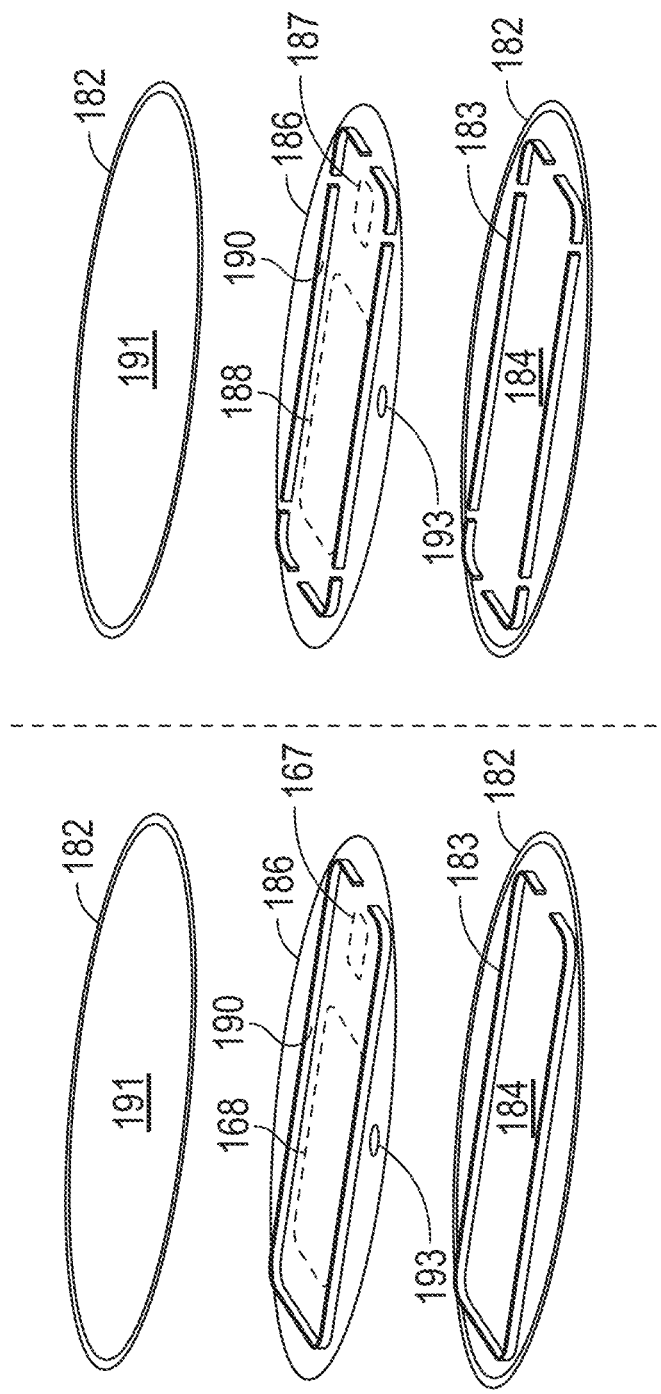
FIG. 10B represents shows an exploded view of the encapsulated waveguide system according to a ninth embodiment in which different examples of spacers may be adopted.

FIG. 10A depicts a cross sectional view of the encapsulated waveguide system according to a ninth embodiment of the technology. The transparent waveguide substrate 186 is arranged between a first outer layer, which in FIG. 10A is the first transparent rigid cover 184, and a second outer layer, which in FIG. 10A is second transparent rigid cover 191. The first and second transparent rigid covers 184, 191 are a pull lens and a push lens, respectively. In some other embodiments, such as for virtual reality display systems, the cover 191, which when the optical system is in use, is furthest from the eye (second transparent cover in FIG. 10A). is made opaque rather than transparent (for example by covering with a reflective coating or using non-transparent cover material).

The transparent waveguide is made from an optical transparent material such as but not limited to glass. The transparent waveguide substrate 186 has the same size as the first transparent rigid cover 184 and second transparent rigid cover 191 in every considered direction i.e., the x-axis, y-axis and z-axis directions.

The substrate 186 is disposed on and spaced apart from first transparent rigid cover 184 and the second transparent rigid cover 191 via one or more spacers. The transparent waveguide substrate 186 arranged between the first transparent rigid cover 184 and the second transparent rigid cover 191 is hermetically sealed by a sealing element 182. In some embodiments, the transparent waveguide substrate 186 is affixed on and spaced apart from the first transparent rigid cover 184 and second transparent rigid cover 191 via double-sided adhesive tape gaskets 183 and 190, respectively (See FIG. 10B) to avoid any optical interaction with them. In some embodiments, spacers other than gaskets may be adopted.

The cavities 185 and 189 are connected to each other via a hole or other passageway 193 (formed for example by drilling through the transparent waveguide substrate 186) so as to form a single cavity. The passageway extending through the transparent waveguide substrate is configured to enable pressure equilibrium around the waveguide.

The transparent waveguide substrate 186 comprises an input area 187 and an output area 188 on its major surface facing the user's eye 181 and the projector module 180. The input area 187 and output area 188 are diffractive optical nanostructures such as gratings, surface relief gratings or holographic optical elements. In some embodiments, the input area 187 and/or output area 188 may be other types of input area and/or output area used in near eye waveguide systems.

Figure 11A:
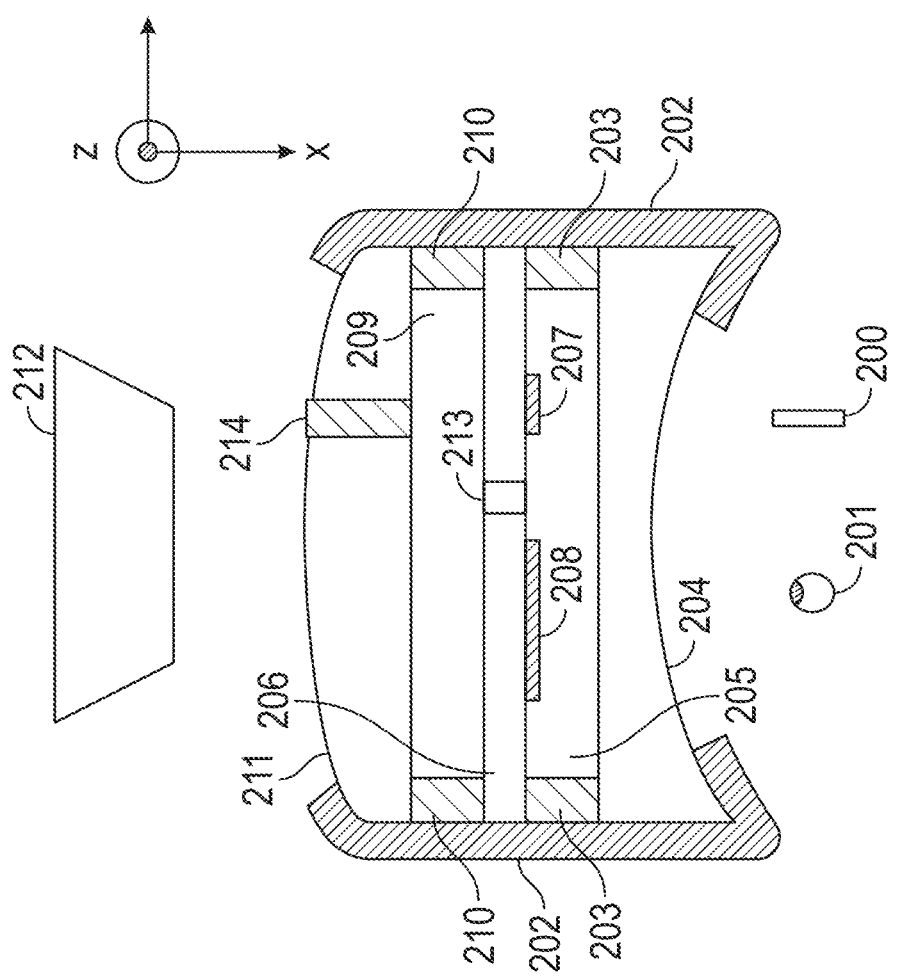
FIG. 11A shows a cross sectional view of the encapsulated waveguide system according to a tenth embodiment.
Figure 11B:
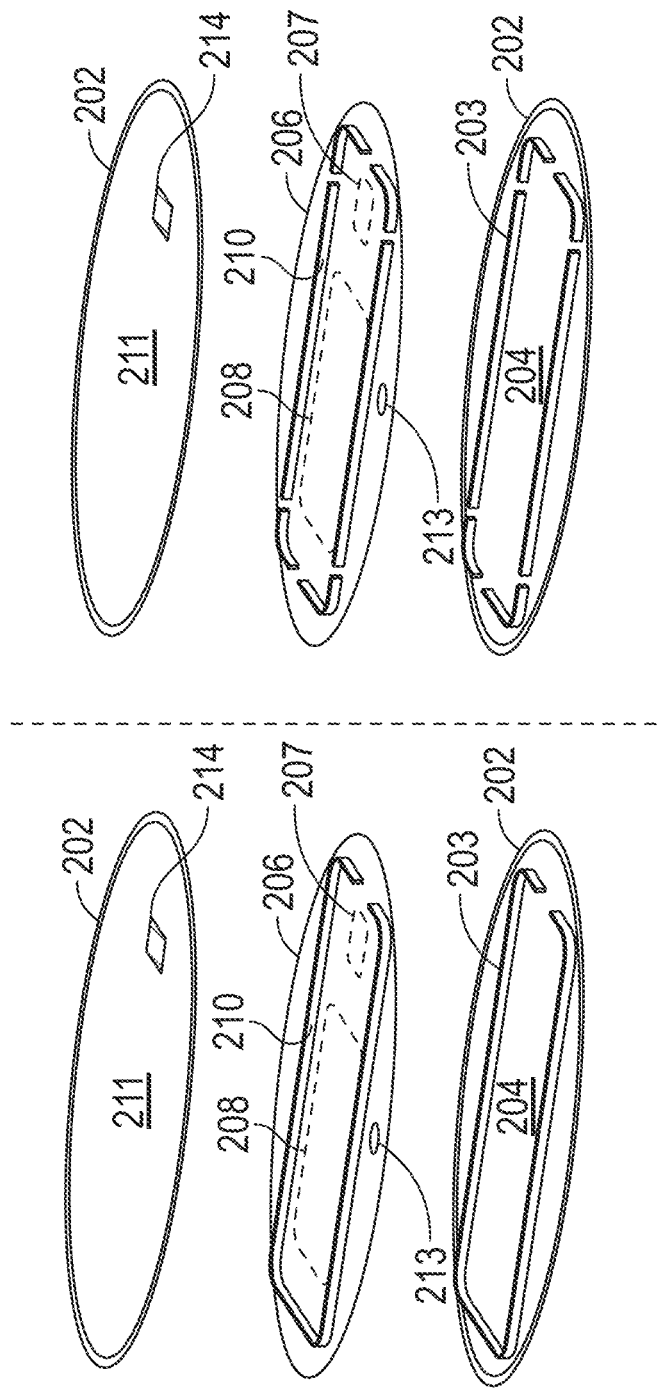
FIG. 11B represents shows an exploded view of the encapsulated waveguide system according to a tenth embodiment in which different examples of spacers may be adopted.
Figure 12:
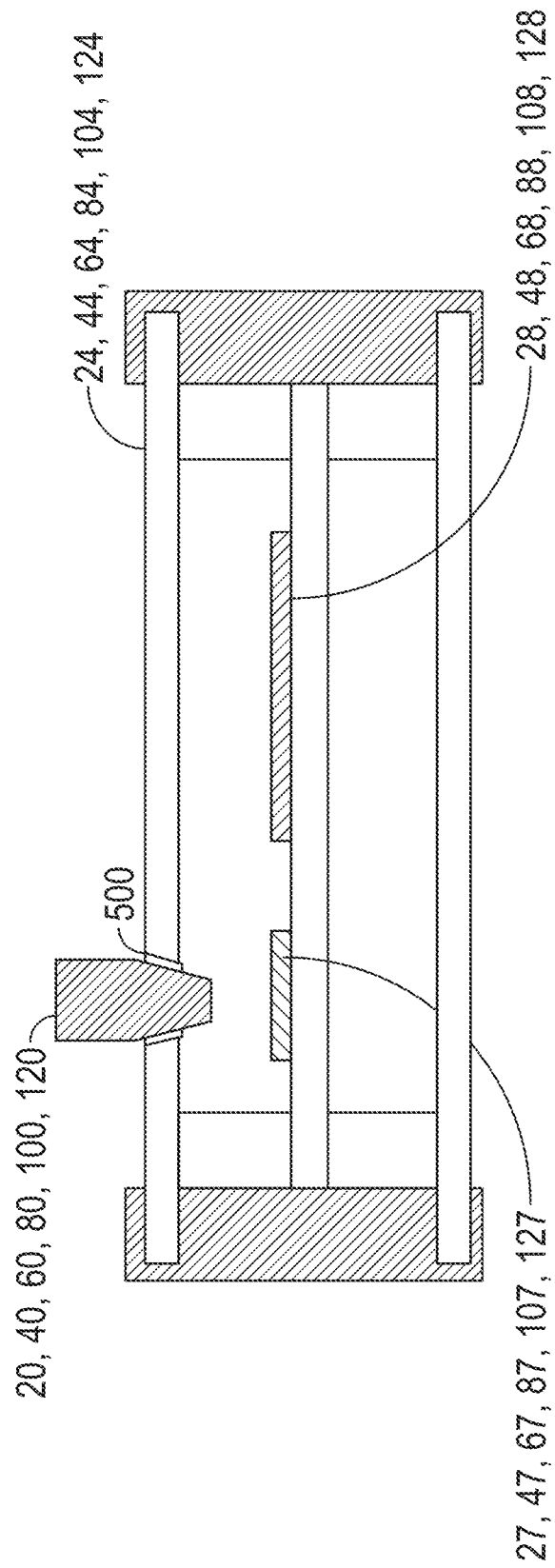
FIG. 12 depicts a cross sectional view of the encapsulated waveguide according to the first, second, third, fourth, fifth and sixth embodiments of the technology, in which a projector module is inserted through the first transparent rigid cover and aligned with the input area.

FIG. 11A depicts a cross sectional view of the encapsulated waveguide system according to a tenth embodiment of the technology. The transparent waveguide substrate 206 is arranged between a first outer layer, which in FIG. 11A is the first transparent rigid cover 204, and a second outer layer, which in FIG. 11A is second transparent rigid cover 211 via one or more spacers. The first and second transparent rigid covers 204, 211 are a pull lens and a push lens, respectively.

The transparent waveguide substrate 206 has the same size as the first transparent rigid cover 204 and second transparent rigid cover 211 in every considered direction, i.e. the x-axis, y-axis and z-axis directions. In some other embodiments, such as for virtual reality display systems, the cover 211, which when the optical system is in use, is furthest from the eye (second transparent cover in FIG. 11A), is made opaque rather than transparent (for example by covering with a reflective coating or using non-transparent cover material). A viewer's surroundings 212 may also be seen by user's eye 201 in embodiments where the second transparent cover 211 is transparent.

The transparent waveguide is made from an optical transparent material such as but not limited to glass. The transparent waveguide substrate 206 is disposed on and spaced apart from the first transparent rigid cover 204 and the second transparent rigid cover 210. The transparent waveguide substrate 206 is arranged between a first transparent rigid cover 204 and a second transparent rigid cover 211 hermetically sealed by a sealing element 202. In some embodiments, the transparent waveguide substrate 206 is affixed on and spaced apart from the first transparent rigid cover 204 and second transparent rigid cover 211 via double-sided adhesive tape gaskets 203 and 210, respectively (See FIG. 11B) to avoid any optical interaction with them. In some embodiments, spacers other than gaskets may be adopted.

The cavities 205 and 209 are connected to each other via a hole or other passageway 213 (formed by for example drilling through the transparent waveguide substrate 206) so as to form a single cavity. The passageway extending through the transparent waveguide substrate is configured to enable pressure equilibrium around the waveguide.

The transparent waveguide substrate 206 comprises an input area 207 and an output area 208 on its major surface facing the user's eye 201 and the projector module 200. The input area 207 and output area 208 are diffractive optical nanostructures such as gratings, surface relief gratings or holographic optical elements. In some embodiments, the input area 207 and/or output area 208 may be other types of input area and/or output area used in near eye waveguide systems.

A pressure relief element 214 is configured to balance pressure between the single or entire cavity formed by cavities 205, 209 and the ambient atmosphere and may be located on or in a major surface of one of the transparent rigid covers 204, 211.

The encapsulated waveguide system of the present technology may be constructed and assembled using transparent rigid covers that are similar in profile to standard ophthalmic lenses, thereby allowing standard prescription frames to be utilized.

In yet a further aspect, and particularly wherein when the first and second transparent rigid covers are formed using a process of 3D printing, such rigid covers may provide for ophthalmic correction of a user's vision, thus providing an arrangement that would permit a user in need of vision correction to require only a single lens to view the real world with superimposed projected images provided by the waveguides. In such arrangements, the innermost rigid cover (that being the one between a user's eye and the at least one waveguide) provides for vision correction, while the outermost rigid cover provides for focal depth compensation of the real-world view. Unlike the prior art which requires a user in need of vision correction to wear ophthalmic lenses near the eye with smart glasses in front of the ophthalmic lenses in order that they may perceive the projected image, which is typically focused at infinity, the present technology may thus permit a user to wear a single lens that both corrects their vision as well as providing for augmented or mixed reality information by way of the integrated encapsulated waveguide.

Figure 16:
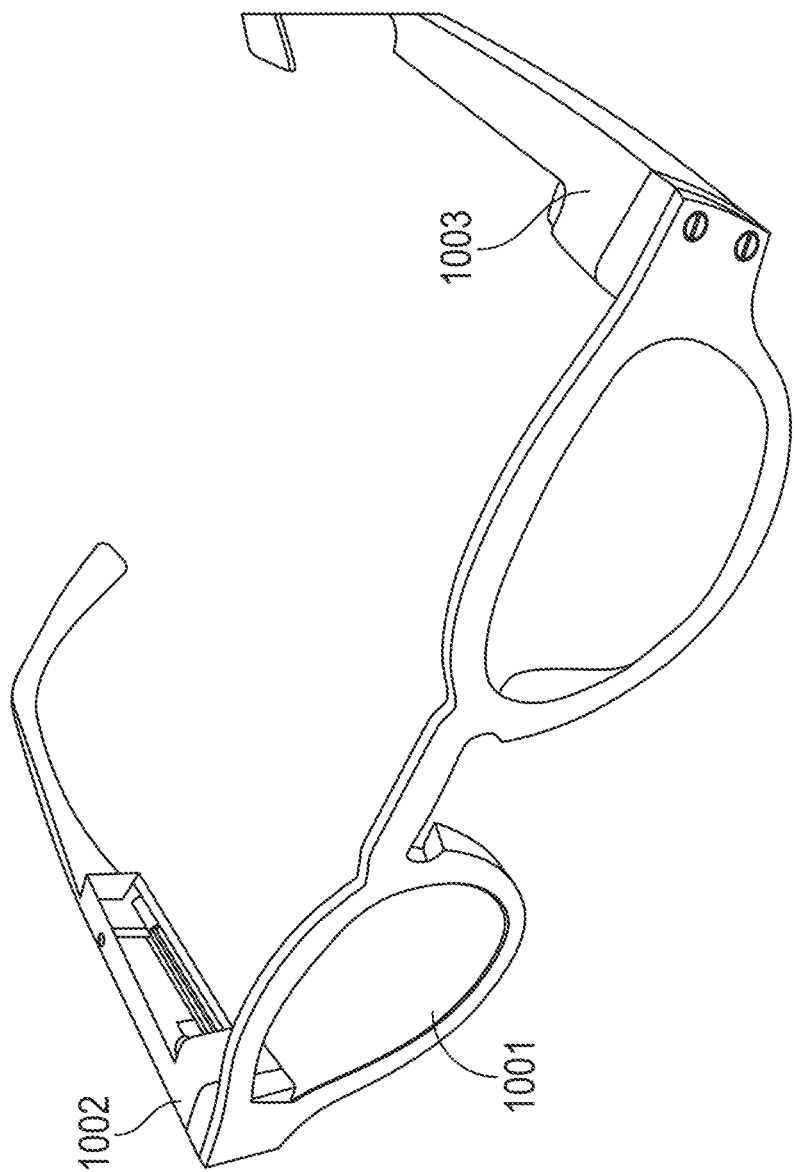
FIG. 16 illustrates an encapsulated waveguide system implemented in eyeglasses according to one aspect.

According to some aspects, there is provided a near eye optical display system. The near eye optical display system may include any one of the encapsulated waveguide systems of the embodiments described herein. In some aspects, any one of the encapsulated waveguide systems of the embodiments described herein may be implemented in a near-eye optical display system having an eyeglass form factor. In some embodiments, the near-eye optical display system has a light engine (projector or other light engine), a battery and an encapsulated waveguide system of any one of the embodiments described herein. The near-eye optical display system may be an AR or VR optical display system. By way of example, near-eye optical display system has a light projector 1002, an encapsulated waveguide system 1001 (which may be an encapsulated waveguide system according to any one of the embodiments disclosed herein) and a battery 1003. The light projector 1002, is optically coupled to the encapsulated waveguide system 1000 and electrically coupled to the battery 1000. The light projector, encapsulated waveguide system and battery are carried on a frame of the eyeglasses and arranged for example as shown in FIG. 16.

It will be appreciated that various of the above-disclosed and other features and functions, or alternatives thereof, may be desirably combined into many other different systems or applications such as head up type displays. Various presently unforeseen or unanticipated alternatives, modifications, variations, or improvements therein may be subsequently made by those skilled in the art which are also intended to be encompassed by the following claims.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated. It will be understood that one or more elements of an embodiment may be omitted or combined with any of the other embodiments, where appropriate.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. An encapsulated waveguide system for a near eye optical display, comprising:
   a first outer layer,
   a second outer layer,
   at least one waveguide substrate comprising an input area and an output area,
   a first spacer, and
   a sealing element,
   wherein the at least one waveguide substrate is disposed between the first and second outer layers and spaced therefrom by the first spacer wherein the sealing element joins edges of the first and second outer layers so as to encapsulate the at least one waveguide substrate within a cavity formed by the first and second outer layers; and
   wherein the formed cavity comprises a first cavity between the at least one waveguide substrate and the first outer layer and a second cavity between the at least one waveguide substrate and the second outer layer, the first cavity having an identical pressure to the second cavity.

2. The encapsulated waveguide system of claim 1, further comprising a second spacer, wherein the at least one waveguide substrate is disposed between the first and second outer layers and spaced therefrom by the first spacer and the second spacer.

3. The encapsulated waveguide system of claim 2, wherein the first spacer and second spacer are continuous spacers.

4. The encapsulated waveguide system of claim 1, wherein the first spacer and second spacer are discontinuous spacers.

5. The encapsulated waveguide system of claim 1, wherein the first and second outer layers protect the at least one waveguide substrate from environmental contamination.

6. The encapsulated waveguide system of claim 1, wherein the at least one waveguide substrate is combined with a second or third waveguide separated from one another by further spacers.

7. The encapsulated waveguide system of claim 1, wherein the at least one waveguide substrate comprises a waveguide subsystem comprising a plurality of waveguides separated from one another by spacers.

8. The encapsulated waveguide system of claim 1, wherein one of the first or second outer layers include an aperture to hermetically receive and optically align a projector module with the input area of the at least one waveguide substrate.

9. The encapsulated waveguide system of claim 1, comprising at least one pressure relief element configured to balance pressure of the first and second cavities between the at least one waveguide substrate and the first and second outer layers with ambient pressure.

10. The encapsulated waveguide system of claim 9, wherein the at least one pressure relief element is disposed within an aperture extending from an exterior surface of the encapsulated waveguide system to one of the first cavity or second cavity.

11. The encapsulated waveguide system of claim 9, wherein the at least one pressure relief element is provided in or between the first and second outer layers.

12. The encapsulated waveguide system of claim 11, wherein the pressure relief element comprises a semi-permeable membrane that allows for exchange of specific gases but permits pressure equalization while avoiding ingress of dust and moisture into said encapsulated waveguide system.

13. The encapsulated waveguide system of claim 9, wherein the pressure relief element comprises a sintered frit.

14. The encapsulated waveguide of claim 9, wherein pressure relief elements are provided between waveguide substrates to mitigate effects of pressure differential between waveguide substrates.

15. The encapsulated waveguide system of claim 1, wherein the at least one waveguide substrate comprises a transparent waveguide substrate and wherein the encapsulated waveguide system further comprises a passageway extending through the transparent waveguide substrate, wherein the first cavity is in fluid communication with the second cavity via said passageway, and wherein the passageway is configured to enable pressure equilibrium around the waveguide substrate.

16. The encapsulated waveguide of claim 1, wherein the outer layer comprises two or more discrete glazing bumps for fixing within a frame.

17. The encapsulated waveguide of claim 1, wherein at least one of the first or second outer layers is an ophthalmic lens.

18. The encapsulated waveguide of claim 1, wherein at least one of the first or second outer layers is prepared using a 3D printing process.

19. A method for assembling an encapsulated waveguide system for a near eye optical display, the method comprising:
   disposing at least one waveguide substrate comprising an input area and an output area between a first outer layer and a second outer layer;
   spacing the at least one waveguide substrate from the first and second outer layers by a first spacer; and
   joining edges of the first outer layer and second outer layer using a sealing element so as to encapsulate the at least one waveguide substrate within a cavity formed by the first and second outer layers, wherein the formed cavity comprises a first cavity between the at least one waveguide substrate and the first outer layer and a second cavity between the at least one waveguide substrate and the second outer layer, the first cavity having an identical pressure to the second cavity.

20. A device, comprising:

a first encapsulation means;

a second encapsulation means;

at least one light-guiding means;

a first spacing means; and a sealing means, wherein the at least one light-guiding means is disposed between the first and second encapsulation means and spaced therefrom by the first spacing means wherein the sealing means joins edges of the first and second encapsulation means so as to encapsulate the at least one light-guiding means within a cavity formed by the first and second encapsulation means; and wherein the formed cavity comprises a first cavity between the at least one light-guiding means and the first encapsulation means and a second cavity between the at least one light-guiding means and the second encapsulation means, the first cavity having an identical pressure to the second cavity.

* * * * *